US012718200B1

(12) United States Patent
Nocera

(10) Patent No.: US 12,718,200 B1
(45) Date of Patent: Aug. 25, 2026

(54) AUTOMATIC BENCHMARKING FOR BENEFIT PLAN PORTALS AND RELATED SYSTEMS

(71) Applicant: Empower Annuity Insurance Company of America, Greenwood Village, CO (US)

(72) Inventor: David J. Nocera, New Milford, CT (US)

(73) Assignee: Empower Annuity Insurance Company of America, Greenwood Village, CO (US)

( * ) Notice: Subject to any disclaimer, the term of this patent is extended or adjusted under 35 U.S.C. 154(b) by 200 days.

(21) Appl. No.: 18/212,118

(22) Filed: Jun. 20, 2023

Related U.S. Application Data

(60) Provisional application No. 63/366,608, filed on Jun. 17, 2022.

(51) Int. Cl.
*G06Q 10/1057* (2023.01)
*G06Q 10/0637* (2023.01)
*G06Q 10/0639* (2023.01)

(52) U.S. Cl.
CPC ... *G06Q 10/1057* (2013.01); *G06Q 10/06375* (2013.01); *G06Q 10/06393* (2013.01)

(58) Field of Classification Search
CPC ......... G06Q 10/1057; G06Q 10/06375; G06Q 10/06393
See application file for complete search history.

(56) References Cited

U.S. PATENT DOCUMENTS

| | | | |
|---|---|---|---|
| 7,100,195 B1 | 8/2006 | Underwood | |
| 8,311,863 B1 | 11/2012 | Kemp | |
| 8,713,025 B2 | 4/2014 | Eder | |
| 11,256,592 B2 * | 2/2022 | Baumgaertel | G06F 11/3024 |
| 11,501,042 B2 | 11/2022 | Steingrimsson et al. | |

(Continued)

FOREIGN PATENT DOCUMENTS

| | | |
|---|---|---|
| FR | 3009412 A1 | 2/2015 |
| WO | 2006096812 A2 | 9/2006 |

(Continued)

OTHER PUBLICATIONS

J. Patrick Kelly, Fulfilment of planned and unplanned purchases of sale- and regular-price items: a benchmark study, 2011, p. 247-263 (Year: 2011).*

(Continued)

*Primary Examiner* — Ibrahim N El-Bathy
(74) *Attorney, Agent, or Firm* — Polsinelli PC

(57) ABSTRACT

A benefit plan service and related methods determine holistic plan scores indicating the general effectiveness of a benefit plan. The service may periodically access one or more plan parameter values for a plurality of benefit plans. Then, the service may calculate a respective plan score for each of the plurality of benefit plans. Calculating a plan score for a benefit plan may include accessing values for various plan parameters, computing a contribution of the parameter values to the plan score, and aggregating each of the contributions to generate the plan score. The service may also automatically determine and updates for benchmarking the plan score against other benefit plans based on various factors, such as the size and industry of the plan sponsor.

20 Claims, 18 Drawing Sheets

(56) References Cited

U.S. PATENT DOCUMENTS

| | | | | |
|---|---|---|---|---|
| 2003/0182147 | A1* | 9/2003 | Mahoney | G06Q 10/1057 705/322 |
| 2005/0187804 | A1 | 8/2005 | Clancy et al. | |
| 2009/0106136 | A1 | 4/2009 | Wright | |
| 2013/0041835 | A1 | 2/2013 | Thompson et al. | |
| 2013/0246086 | A1 | 9/2013 | Mun et al. | |
| 2016/0321935 | A1 | 11/2016 | Mohler et al. | |
| 2017/0006135 | A1 | 1/2017 | Siebel et al. | |
| 2018/0060797 | A1 | 3/2018 | Stefik et al. | |
| 2018/0121844 | A1* | 5/2018 | Alwine | G06F 21/577 |
| 2019/0266042 | A1 | 8/2019 | Dust | |
| 2019/0355063 | A1 | 11/2019 | Probetts et al. | |
| 2021/0103895 | A1 | 4/2021 | Morrow et al. | |
| 2021/0272067 | A1 | 9/2021 | Santos et al. | |
| 2022/0028548 | A1 | 1/2022 | Colburn et al. | |
| 2022/0270738 | A1 | 8/2022 | Mason et al. | |
| 2023/0237582 | A1 | 7/2023 | Probetts | |

FOREIGN PATENT DOCUMENTS

| | | |
|---|---|---|
| WO | 2007018486 A1 | 2/2007 |
| WO | 2015066250 | 5/2015 |
| WO | 2020176981 A1 | 9/2020 |

OTHER PUBLICATIONS

Layton, Timothy J., et al. "Measuring efficiency of health plan payment systems in managed competition health insurance markets." Journal of Health Economics 56 (2017): 237-255.

USPTO-Final Office Action, U.S. Appl. No. 18/212,110, dated Jan. 3, 2024, 20 pgs.

Non-Final Office Action, U.S. Appl. No. 18/212,110, dated Jul. 1, 2024, 21 pgs.

Kshirsagar, Rohun et al. "Accurate and interpretable machine learning for transparent pricing of health insurance plans." Proceedings of the AAAI Conference on Artificial Intelligence, vol. 35. No. 17. (2021).

Duncan, Ian et al. "Testing alternative regression frameworks for predictive modeling of health care costs." North American Actuarial Journal 20.1: 65-87 (2016).

Kanchetti, D., "Optimization of insurance claims management processes through the integration of predictive modeling and robotic process automation," International Journal of Computer Applications, vol. 2, Issue 2, Jul.-Dec. 2021, pp. 1-18.

Flak, L . S et al., "An Exploratory Approach for Benefits management in e-Government: Insights from 48 Norwegian Government Funded Projects," IEEE, date of Conference Jan. 7-10, 2008, pp. 1-13.

U.S. Patent and Trademark Office, Non-Final Office Action, U.S. Appl. No. 18/212,110, Jun. 17, 2025, 35 pages.

U.S. Patent and Trademark Office, Non-Final Office Action, U.S. Appl. No. 18/212,114, Apr. 25, 2025, 26 pages.

U.S. Patent and Trademark Office, Final Office Action, U.S. Appl. No. 18/212,112, Oct. 1, 2025, 42 pages.

U.S. Patent and Trademark Office, Final Office Action, U.S. Appl. No. 18/212,114, Oct. 2, 2025, 44 pages.

U.S. Patent and Trademark Office, Non-Final Office Action, U.S. Appl. No. 18/212,112, Apr. 18, 2025, 26 pages.

U.S. Patent and Trademark Office, Final Office Action, U.S. Appl. No. 18/212,110, Dec. 30, 2025, 37 pages.

* cited by examiner

500

Before we continue, please answer a few questions about your organization, workforce and benefit offerings.

Skip Questionnaire

Do You Anticipate Any Major Changes In The Next Three To Five Years?

This helps us offer targeted solutions and insights that can help you navigate change

- [ ] Major changes to health plans
- [ ] Major changes to retiree health care
- [ ] Major changes to disability plan
- [x] Major change in retirement plan/contribution
- [ ] Early retirement/voluntary buyout
- [x] Workforce expansion
- [x] Workforce contraction
- [x] M&A activities
- [x] Pension risk transfer
- [x] Major demographic shifts
- [ ] None
- [ ] Other

Which Of The Following Challenges Are Most Common For Your Workforce?

This helps us offer targeted solutions and insights that can help you navigate change

- [ ] Managing day-to-day finances (e.g., basic budgeting, paying bills on-time, saving)
- [x] Paying down debt (credit cards, auto or home loans, student loans)
- [ ] Protecting against key risks (e.g., emergency savings, disability and life insurance, health care costs in retirement)
- [x] Achieving important financial goals (e.g., buying a home, retiring on-time, not running out of money in retirement)
- [ ] Other
- [ ] All of the above
- [ ] None

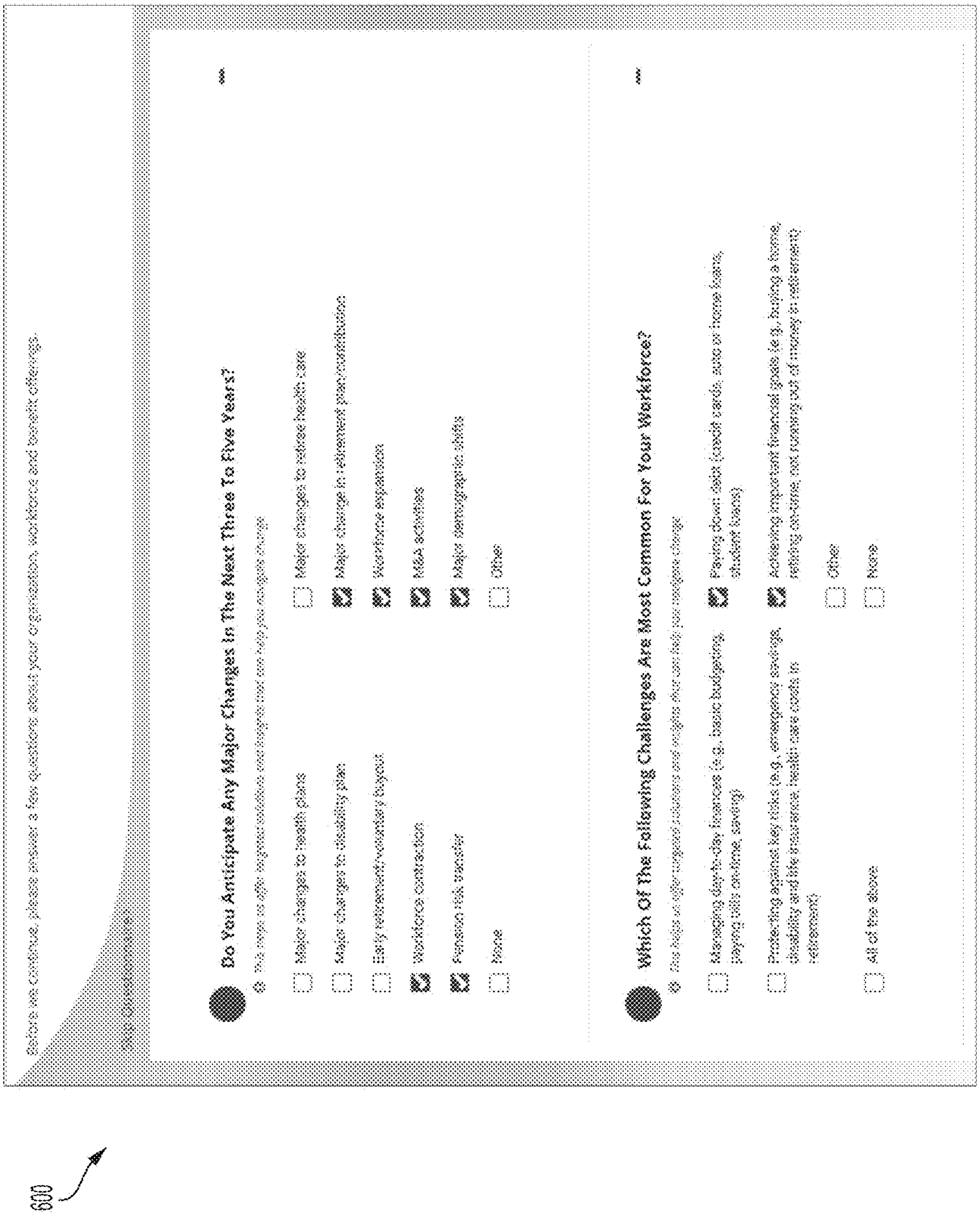

AUTOMATIC BENCHMARKING FOR BENEFIT PLAN PORTALS AND RELATED SYSTEMS

CROSS-REFERENCE TO RELATED APPLICATIONS

The present application claims the priority benefit of U.S. provisional application No. 63/366,608 titled "Dynamic Updating and Predictive Modelling in Benefit Plan Portals and Related Systems" and filed Jun. 17, 2022, the disclosure of which is incorporated herein by reference in its entirety.

FIELD

The present disclosure relates to systems for administration of benefit plans. In one example, the systems and methods described may include tools for benefit plan sponsors to evaluate the effectiveness of a benefit plan, to model the effects of changes to the benefit plan, and to benchmark the benefit plan against similar entities.

SUMMARY

Disclosed embodiments may provide various improvements to systems for administering benefit plans. In certain aspects of this disclosure, a benefit plan service determines a holistic plan score indicating the general effectiveness of a benefit plan. The benefit plan service further includes various models and algorithms for predicting changes to the holistic plan score and plan-related performance metrics, models for dynamically updating the scoring system, and functionality for dynamically updating benefit plan benchmarks. In certain implementations, the score computed by the benefit plan service may be based, in part, on interaction between plan participants and resources provided through a plan participant portal. Accordingly, another aspect of this disclosure includes tracking/logging of interactions between plan participants and available resources for purposes of calculating the plan score.

This disclosure describes various implementations in detail, below. While this paper discusses specific implementations, such implementations are for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one implementation" or "an implementation" means that at least one implementation of the disclosure includes the particular feature, structure, or characteristic described in connection with the implementation. The appearances of the phrase "in one implementation" in various places in the specification are not necessarily all referring to the same implementation, nor are separate or alternative implementations mutually exclusive of other implementations. Moreover, this disclosure describes various features which can be included in some implementations and not in others.

The terms used in this specification have their ordinary meanings in the art, within the context of the disclosure, and in the specific context where this disclosure uses each term. Alternative language and synonyms can be used for any one or more of the terms discussed, and no special significance should be placed upon whether a term is elaborated on or discussed in detail. In some cases, this disclosure provides synonyms for certain terms. A recital of one or more synonyms does not exclude the use of other synonyms. The use of examples anywhere in this specification, including examples of any terms discussed in this disclosure, is illustrative only, and does not further limit the scope and meaning of the disclosure or of any example term. Likewise, the disclosure is not limited to the various implementations given in this specification do not limit the disclosure and other implementations not explicitly discussed in this disclosure are within its scope.

Without intent to limit the scope of the disclosure, this disclosure provides examples of instruments, apparatus, methods and their related results according. Titles or subtitles can be used in the examples for convenience of the reader, but in no way limit the scope of the disclosure. Unless otherwise defined, technical and scientific terms used in this disclosure have the meaning as commonly understood by one of ordinary skill in the art pertinent to this disclosure. In the case of conflict, the present document, including any definitions included in this document will control.

BRIEF DESCRIPTION OF THE DRAWINGS

Illustrative embodiments are described in detail below with reference to the following figures.

FIGS. 6A-6C show an example questionnaire that may be presented to sponsors through the plan sponsor portal;

DETAILED DESCRIPTION

Figure 1:
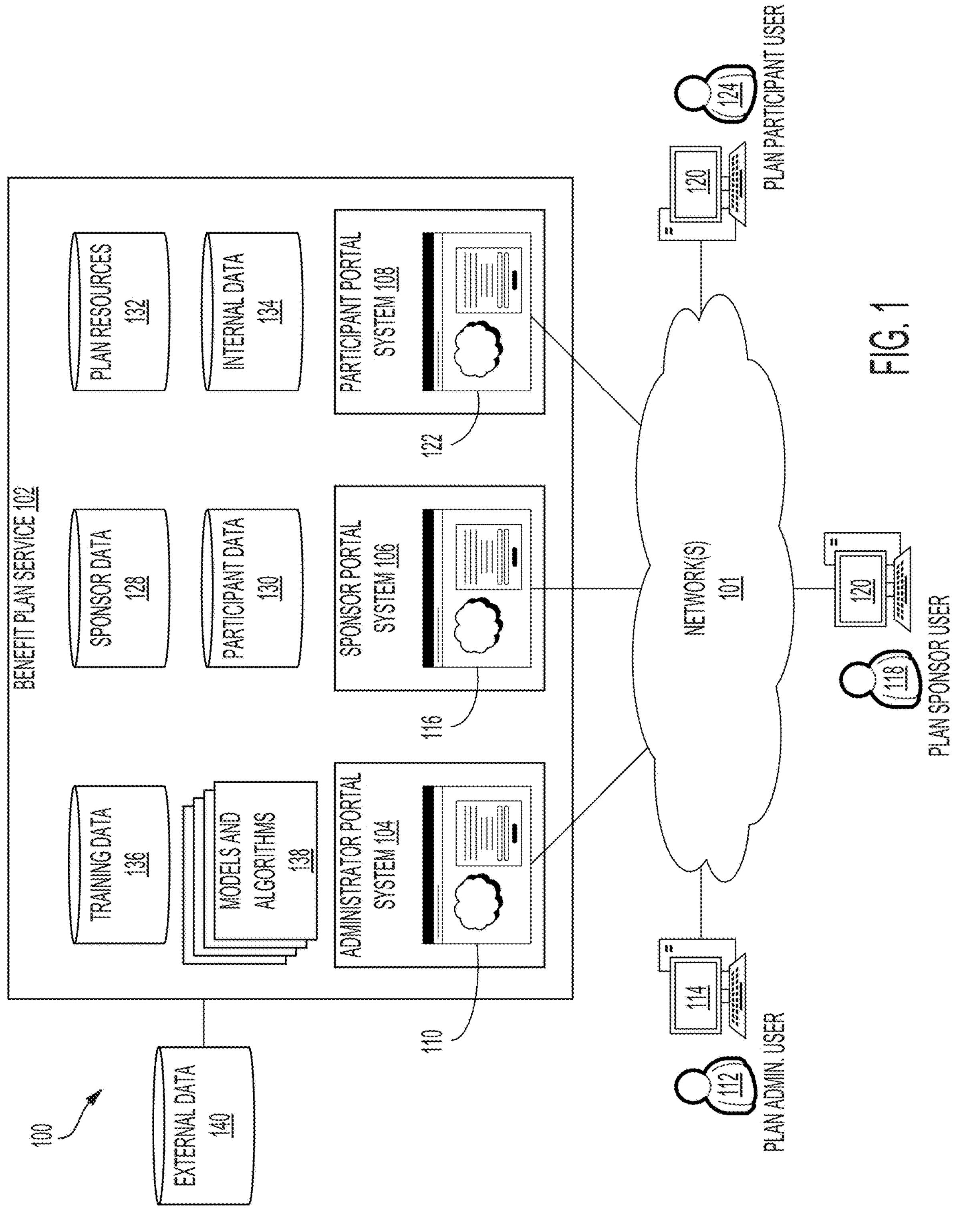
FIG. 1 shows an illustrative example of an environment including a benefit plan service for administering a benefit plan where the benefit plan service also hosts various portals for administrators, sponsors, and participants of benefit plans.

For the purposes of explanation, the following description includes specific details to provide a thorough understanding of certain inventive concepts included in this disclosure. Various embodiments may be practiced without these specific details. Also, the figures and description included with this disclosure are non-limiting. The word "exemplary" is used herein to mean "serving as an example, instance, or illustration." Any embodiment or design described as "exemplary" is not to be construed as preferred or advantageous over other embodiments or designs.

Implementations of this disclosure may include a benefit plan service configured to host one or more portals associated with a given benefit plan. The portals include a sponsor portal through which a plan sponsor can access, evaluate, and modify a benefit plan supported by the benefit plan service.

Among other features, the benefit plan service dynamically generates scores and benchmarks for benefit plans. For example, when a sponsor accesses the benefit plan service through a sponsor portal, the portal may present a score indicating the general effectiveness of the benefit plan. The score provides a simple and holistic metric by which the sponsor can quickly evaluate the current state of the benefit plan and whether modifications to the benefit plan may be necessary.

The benefit plan service calculates the score for a given benefit plan based on current and historic data collected by the benefit plan service. When generating a score for a given benefit plan, the benefit plan service can consider the design of the benefit plan, engagement of plan participants with the benefit plan, and access and use of other programs and resources related to the benefit plan, among other things. The plan benefit service may also track usage of resources provided to plan participants and may further base the score on whether and to what extent the resources are being used.

The benefit plan service may score benefit plans based on a predetermined and fixed weighting of different plan parameters. Alternatively, the benefit plan service may score benefit plans using a dynamic scoring system that receive current and historical benefit plan data and provide updated parameter ranges, weights, and other aspects for the score calculation.

The benefit plan service can calculate scores for multiple benefit plans and provide benchmarking data to sponsors. The benchmarking data can be broad (e.g., across all plans) or can be limited by various factors. For example, the sponsor portal may present a benchmark score that is limited by industry, organization size, organization type, plan type, and the like. The benefit plan service may periodically collect and regenerate scores for benefit plans it supports such that the benchmarking data remains current.

Certain implementations of the sponsor portal may also include modelling functionality to guide modifications to a benefit plan. The modelling functionality allows a sponsor to change various parameters of a benefit plan. Predictive models of the benefit plan service then use the modified parameters and other data maintained by the benefit plan service to predict various outcomes if the sponsor were to implement the changes. For example, the predictive models may generate an estimated cost (or savings) for implementing the proposed changes and predicted changes to one or more plan-related metrics, such as a plan participation rate.

The foregoing and other features of implementations of this disclosure are provided in further detail below. While this disclosure primarily uses a retirement benefit plan as an example, the various concepts and features of described in this disclosure are applicable to other benefit plans including those related to education, wellness, health, insurance, employee retention, succession planning, flexible work, risk management, regulatory compliance, personal wealth (e.g., general account management, transactions, investing, individualized risk strategies, event planning), income, giving, allocation management (e.g., budgeting), debt management, life, career, and any other benefits that may be provided by an organization to its employees and affiliates or by a company to its customers.

The following disclosure refers to benefit plans, participants, plan administrators, and plan sponsors. A benefit plan generally refers to non-wage compensation or similar perks provided to an employee or other affiliate of an organization. Among other things, benefit plans may be related to various types of insurance (e.g., health insurance, life insurance, disability insurance), health (e.g., wellness plans), work flexibility, education (e.g., tuition reimbursement plans, educational resources), and finance/retirement (e.g., 401(k) or similar retirement plans, personal finance, investing, and wealth management). While the following disclosure provides examples of benefit plans in the context of retirement benefit plans in which benefit plans can be modeled, modified/optimized, and benchmarked, among other functions, for the benefit plan sponsor, the disclosure is not limited to this context. In an implementation, a personal/individual wealth plan involving retirement planning, career planning, life planning, investing, spending, giving, and saving may be modeled, modified/optimized, and benchmarked, among other functions, for the individual participant for the purpose of assessing overall financial health (e.g., retirement readiness). Notably, while this disclosure may use the term "employee" and "employer" to refer to plan participants and the organizations that provide benefit plans, implementations of this disclosure are not limited to benefits in the context of an employee-employer relationship. For example, implementations of this disclosure may be directed to management of benefits for volunteers and volunteer organizations, students and educational institutions, customers and companies, or any other similar relationship in which an organization provides a benefit or program to individuals (or families) associated with the organization. With that in mind, the term "plan participant" refers to an individual or group of individuals that receives a benefit or otherwise has access to a benefit plan. Often, the plan participant is an employee or similar affiliate of an organization that sponsors or otherwise provides access to the benefit; however, as noted, the plan participant may alternatively be a volunteer, a student, or other entity associated with an organization providing a benefit. A "plan administrator" refers to an entity that manages, runs, or otherwise provides services associated with a benefit plan. Finally, a "plan sponsor" refers to a designated party—usually a company or employer—that sets up, maintains, modifies and monitors a benefit plan on behalf of plan participants.

A. System Overview

FIG. 1 shows an illustrative example of an environment 100 for providing and administering a benefit plan through various online portals. Environment 100 includes a benefit plan service 102 that includes each of an administrator portal system 104, sponsor portal system 106, and a participant portal system 108.

Administrator portal system 104 includes and provides access to an administrator portal 110 to authorized users, such as plan administrator user 112, who is illustrated as accessing administrator portal 110 over a network 101 using a plan administrator computing device 114. Administrator portal 110 may provide a user interface through which plan administrator user 112 can administer and review benefit plans supported by benefit plan service 102. Administrator portal 110 is accessible by users associated with an administrator of the benefit plan supported by benefit plan service 102 and allows such users to access information regarding benefit plans, update and modify benefit plans, research and analyze plan sponsors and participants, and perform other functions related to providing benefit plan. Administrator portal 110 may also facilitate communication between users associated with a plan administrator and plan sponsors and/or plan participants for technical support, advice, and other similar purposes. In at least some implementations, administrator portal 110 may provide reporting and analysis functionality on any of a participant level, plan sponsor level, or system-wide level to further guide and inform how to design, provide, and support benefit plans.

Sponsor portal system 106 includes and provides access to a sponsor portal 116 to authorized users, such as plan sponsor user 118 who is illustrated as accessing sponsor portal 116 over network 101 using a plan sponsor computing device 120. Sponsor portal 116 provides a user interface through which plan sponsor user 118 can access current and historical benefit plan information. Among other things, sponsor portal 116 may allow plan sponsors to access and review information regarding current benefit plans, to view and learn about available options for benefit plans provided by the plan administrator, register and e-register employees for benefit plans, and other sponsor-related functions. As discussed below in further detail, in implementations of this disclosure sponsor portal 116 also includes a holistic score or similar metric that is dynamically updated and that provides a clear indication of the effectiveness of a given benefit plan. As further described in this disclosure, sponsor portal 116 can also provide scoring and benchmarking of the benefit plan, modelling tools for evaluating various plan options, automated recommendations, and other related functionality to assist sponsor portal 116 in developing an effective and cost-efficient benefit program.

Participant portal system 108 includes and provides access to a participant portal 122 to authorized users, such as plan participant user 124, who is illustrated as accessing participant portal 122 over network 101 using a plan participant computing device 126. To the extent plan participant user 124 is associated with an account related to a benefit plan supported by benefit plan service 102, participant portal 122 includes a user interface through which plan participant user 124 can view his or her account, view and update personal information, make modifications to plan-related options and elections, among other things. In at least certain implementations, participant portal 122 also provides access to various resources relevant to the corresponding benefit plan. For example, participant portal 122 can include educational resources, tools (e.g., calculators), external links to other resources, and other similar resources that may be beneficial to plan participant user 124. Through participant portal 122, a plan participant may access his or her benefit plan account, review historical account activity, modify account preferences and benefit plan options, and the like. In certain implementations, participant portal 122 may include or otherwise provide access to resources such as articles, videos, audio recordings, interactive tools and modules, and the like for purposes of educating or otherwise engaging the plan participant. The participant portal 122 may also support multiple communication modalities (e.g., email, in-portal messaging, live chat, video chat, etc.) for facilitating communication between a plan participant and a representative associated with the plan administrator.

The foregoing descriptions of administrator portal 110, sponsor portal 116, and participant portal 122 are intended to provide an overview of the portals and their respective functions. The portals may provide other features and functions not specifically describe in this disclosure. For example, administrator portal 110 may include other features and functionality relevant to operating and maintaining benefit plans on behalf of sponsors, sponsor portal 116 may include other features and functionalities directed to managing a specific benefit plan on behalf of employees or other individuals affiliated with the sponsor, and participant portal 122 may include other features and functionalities directed to accessing and otherwise using a given benefit plan.

Benefit plan service 102 may also include various data sources for storing data relevant to providing a benefit plan. For example, benefit plan service 102 includes each of a sponsor data source 128, a participant data source 130, a plan resource data source 132, and an internal data source 134. FIG. 1 illustrates the various data sources as being separate; however, in other implementations one or more of the data sources may be combined into a common data source. In environment 100, benefit plan service 102 includes each of data sources 128-134. In other implementations, such data sources may instead be external to but accessible by benefit plan service 102. For example, one or more of data sources 128-134 may be maintained in a cloud-based system accessible by benefit plan service 102. Also, while FIG. 1 illustrates data sources 128-134 as being separate and distinct, such illustration in FIG. 1 is primarily for purposes of clarity and to differentiate the various categories of data that may be maintained by and for the benefit of benefit plan service 102.

Sponsor data source 128 includes information corresponding to plan sponsors of benefit plans supported by benefit plan service 102. Among other things, sponsor data source 128 may store current and historical information for different sponsors. The information for each sponsor may include characteristics and information about the sponsor itself, such as the number of employees of the sponsor, the type of employees employed by the sponsor, financial information about the sponsor, and the like. The information for each sponsor may further include information about benefit plans provided by the sponsor as well as characteristics or parameters for those benefit plans. For example, sponsor data source 128 may store characteristics and statistical data for a benefit plan provided by the sponsor and supported by benefit plan service 102. Benefit plan information may also include information regarding benefit plans outside of those supported by benefit plan service 102. For example, in the context of retirement plans, benefit plan service 102 may be for a 401(k) or similar retirement plan, but the sponsor may further provide a pension or similar defined benefit plan to some or all of its employees. Accordingly, information about the defined benefit plan may also be stored in sponsor data source 128.

Sponsor data source 128 may also include information collected by plan sponsors by benefit plan service 102. For example, in certain implementations, plan sponsors may be presented with a questionnaire or similar form by sponsor portal 116 (e.g., in response to an initial login by a plan sponsor or periodically over time) and sponsor data source 128 may store responses to the questionnaire. In at least certain implementations, sponsor data source 128 may also store records associated with communications between client-facing personnel associated with benefit plan service 102 and plan sponsors. Among other things, such records may include correspondence (e.g., copies of emails), meeting notes, chat logs, memoranda, and similar records of interactions with the plan sponsor.

Participant data source 130 includes information corresponding to participants of benefit plans supported by benefit plan service 102. Among other things, information stored in participant data source 130 may include personal information for plan participants. Each participant may be associated with a respective account. Accordingly, participant data source 130 may also store current and historic account data. Participant data source 130 may also include logs or similar records that capture interaction between participants and participant portal 122.

Plan resource data source 132 includes informational and other resources available through the various portals of benefit plan service 102 and related data. For example, plan resource data source 132 may include audio files, video files, articles, interactive modules, images/graphics, and other similar resources that may be presented by or accessed through one of the portals. In at least certain implementations, plan resource data source 132 may also store usage/access data and related statistics for resources made available through benefit plan service 102. As discussed below in further detail, such usage and access data may be relied upon by benefit plan service 102 to determine the effectiveness of a given benefit plan. For example, in implementations in which benefit plan service 102 generates a holistic score or similar metric indicating the effectiveness of a benefit plan, at least one element in the score may be based on use of resources by plan participants.

Internal data source 134 includes any other data that may be relevant to evaluating benefit plans but that the preceding descriptions of data sources may not fully capture. In at least some implementations, a recordkeeping system may at least partially populate internal data source 134 where the recordkeeping system automatically captures and stores data corresponding to interactions between sponsors and participants and aspects of benefit plan service 102.

Environment 100 further includes an external data source 140 accessible by benefit plan service 102. For example, in the context of a retirement benefit plan, external data source 140 may include investment price information (e.g., stock prices), currency exchange data, and the like. More generally, external data source 140 includes any data that can be accessed or otherwise obtained by benefit plan service 102 from a source outside of benefit plan service 102. For example, external data source 140 may be accessible by benefit plan service 102 through an application program interface (API) or service provided by a host of external data source 140. External data source 140 may also include data sources that can be "scraped" or similarly processed by benefit plan service 102 to extract relevant data. Accordingly, external data source 140 may include, but is not limited to, one or more of databases, websites, external files, data services, etc. External data source 140 may also include external resources like those maintained in plan resource data source 132. For example, external data source 140 may include articles, videos, websites, interactive modules, etc. that are embedded within sponsor portal 116 or participant portal 122 or linked within the portals.

In certain implementation, benefit plan service 102 may include one or more models or algorithms to provide or support various functions and features of benefit plan service 102, and which are collectively indicated in FIG. 1 as models and algorithms 138. Examples of models and algorithms 138 include predictive models for predicting the outcome of changes to benefit plans, models and algorithms for scoring and benchmarking benefit plans, and models and algorithms for updating and revising scoring parameters, each of which is discussed in further detail as part of this disclosure. To support and revise models and algorithms 138, benefit plan service 102 may maintain and update a collection of training data in a training data source 136. Examples of training data are similarly discussed below in the context of specific models and algorithms.

Network 101 represents any one or more communication networks for facilitating communication between user computing devices (e.g., plan administrator computing device 114, plan sponsor computing device 120, and participant computing device 126) and benefit plan service 102. While illustrated as a single entity, network 101 may be made up of any combination of networks and subnetworks suitable for facilitating communication between computing devices and benefit plan service 102. By way of example, network 101 may be the Internet and one or more of plan administrator computing device 114, plan sponsor computing device 120, and participant computing device 126 may include Internet browsers configured to render a website or similar online resource corresponding to administrator portal 110, sponsor portal 116, and participant portal 122, respectively. Alternatively, the computing devices may execute an application or similar software configured to communicate with benefit plan service 102 over network 101. Accordingly, while each of the computing devices in FIG. 1 are generally illustrated as desktop computers, they may be any suitable computing device capable of communicating with benefit plan service 102 including, but not limited to, a desktop computer, a laptop computer, a tablet, and a smart phone.

Environment 100 illustrates one each of plan administrator user 112, plan sponsor user 118, and plan participant user 124 as examples users. More generally, environment 100 may include any number of such users, each of which may have access to a corresponding portal based on the type of user.

B. Example Plan Sponsor Portal

As previously discussed, benefit plan service 102 may provide plan sponsors with an efficient and effective way to evaluate benefit plans, such as by providing a holistic score for a benefit plan and by enabling easy comparison of such score to those of other benefit plans. Benefit plan service 102 may also provide tools for analyzing potential modifications to a benefit plan and predicting the potential outcomes associated with implementing those changes. In at least certain implementations, benefit plan service 102 provides these features via sponsor portal 116, which can be a web-based portal, an application executed on plan sponsor user 118, or otherwise accessible through a computing device associated with a plan sponsor.

To give additional context for this disclosure, FIGS. 2-7 illustrate various elements of an example sponsor portal. The sponsor portal illustrated in FIGS. 2-7 is for a retirement benefit plan; however, many of the features of the retirement benefit plan sponsor portal can be readily adapted and modified for other types of benefit plans including, but not limited to those related to health, wellness, and education.

Figure 2:
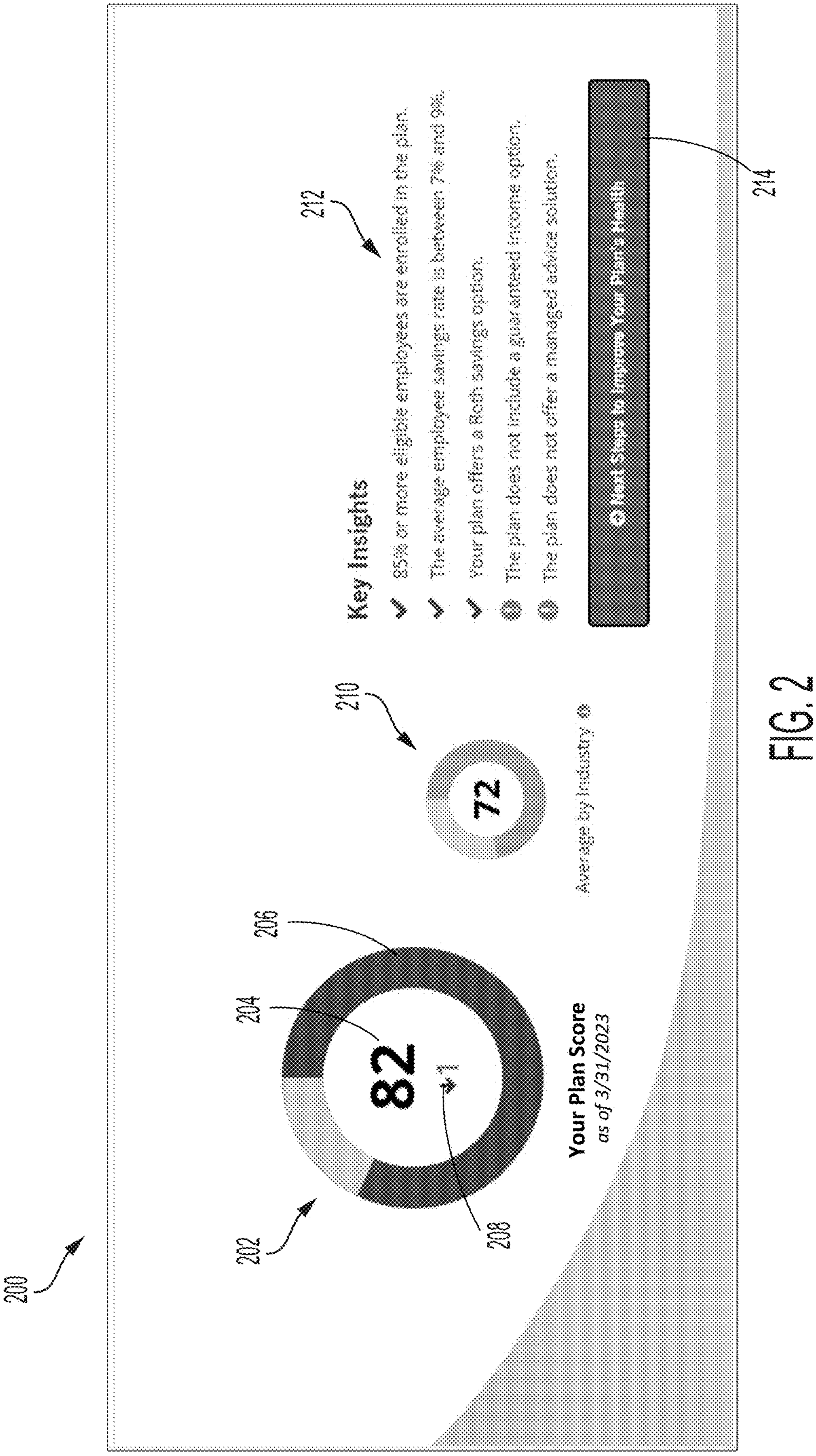
FIG. 2 shows an example summary screen or section of a plan sponsor portal.

Referring first to FIG. 2, sponsor portal 116 may include a summary screen 200 for a benefit plan. Summary screen 200 includes a score area 202, which displays a score calculated by benefit plan service 102 for the benefit plan. While this disclosure describes scoring of benefit plans in further detail below, by way of introduction, benefit plan service 102 generates a score for a benefit plan as a weighted combination of various parameters and characteristics of the plan. In certain instances, the parameter may be continuous (e.g., participation rate is a continuous percentage) and the weighted contribution of the parameter may be based on the value of the parameter with respect to a range for the parameter. In other implementations, a parameter may be binary or discrete (e.g., whether coaching or supplemental educational materials are provided as part of the benefit plan) such that the weighted contribution of the parameter to the total score is similarly binary or discrete (e.g., full contribution if coaching is provided and no contribution if not). Once calculated, benefit plan service 102 combines the contributions of each parameter to arrive at a score for the benefit plan.

Score area 202 may include a numerical representation 204 and/or a graphical representation 206 of the score for a benefit plan. For example, in FIG. 2, numerical representation 204 is a number from 0-100 while graphical representation 206 is a ring filled based on the numerical representation 204. In other implementations, score area 202 may present the score in alternative ways. For example, and without limitation, score area 202 may present the score as a numerical range (e.g., 0-100, 0-10, etc.), a grade (e.g., A to F), or a number of graphical elements (e.g., stars, dots, etc.). Score area 202 may also include variable shapes other than a ring that may vary based on the score. Score area 202 may also vary other visual elements, such as color, based on the score. For example, a green number or graphic could indicate a score above a certain threshold score, a yellow number or graphic may indicate a score at or near a threshold score, and a red number or graphic could indicate a score that is substantially below a threshold score.

Score area 202 further includes a change indicator 208 that communicates changes in the score over time. For example, the score may be updated on a quarterly basis (or other frequency) and change indicator 208 may indicate any change in the score from the preceding update. As shown, change indicator 208 includes a number ("1") indicating the degree of change in the score along with an arrow indicating the direction of the change (down/decrease). Change indicator 208 may be colored, animated, or otherwise enhanced to further communicate any changes in the score.

Summary screen 200 also includes a benchmark area 210 that can include a benchmark score to provide context to the plan sponsor. Like score area 202, benchmark area 210 may include one or more of alphanumeric, graphical, or other elements indicating a benchmark score related to the benefit plan. For example, benefit plan service 102 may generate the benchmark score as an average score for other similar benefit plans provided by other organizations. In certain implementations, the benchmark score may be based on industry or other limitation.

In certain implementations, summary screen 200 may also include an insights area 212 that presents a summary of the benefit plan's effectiveness. As shown in FIG. 2, insights area 212 indicates that employee savings rate and the existence of a guaranteed income/annuity option are considered positive aspects of the benefit plan while contribution escalation usage and participation enrollment are potential areas for improvement.

Figure 3A:
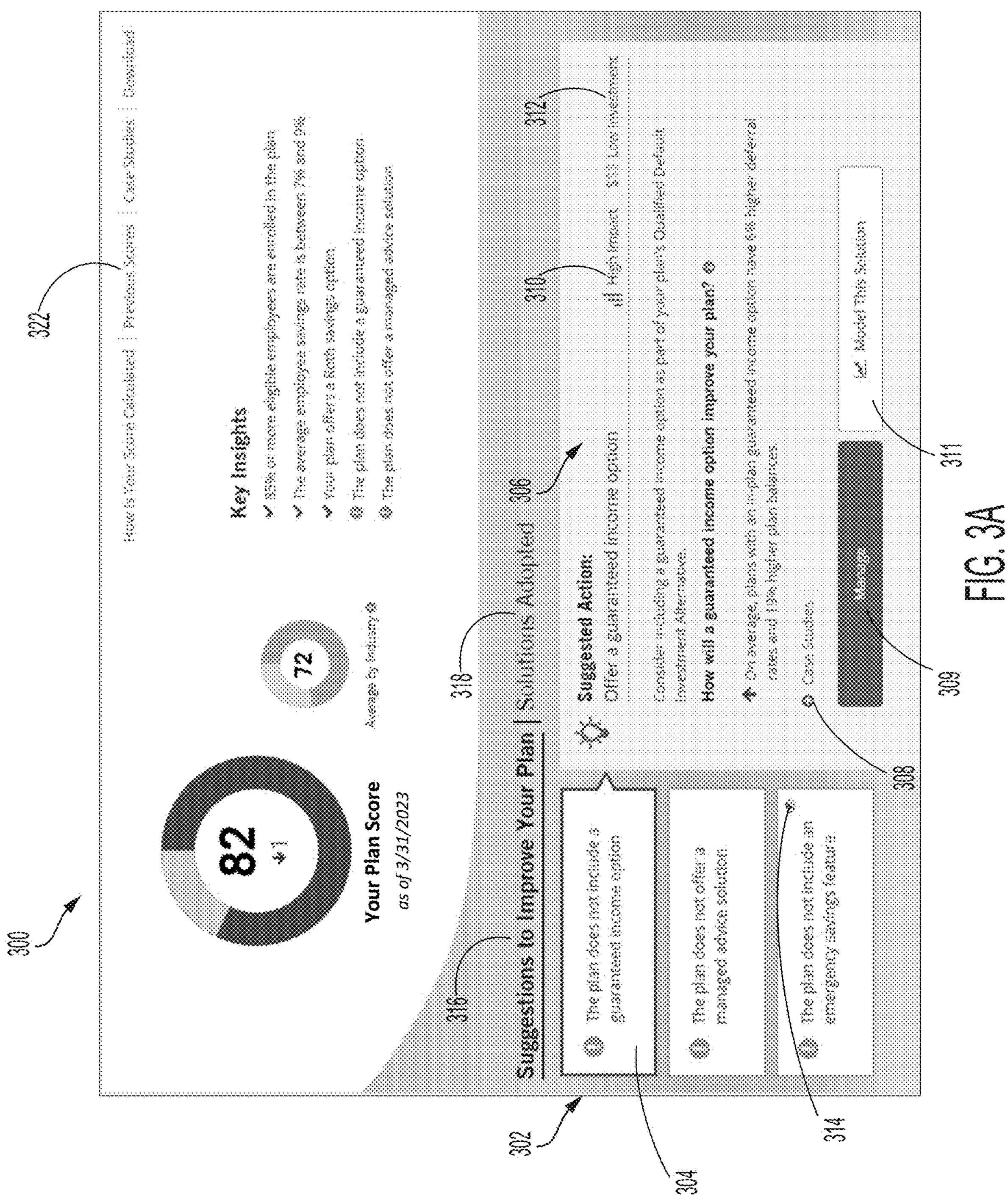
FIGS. 3A and 3B show an example suggestions screen or section of the plan sponsor portal.
Figure 3B:
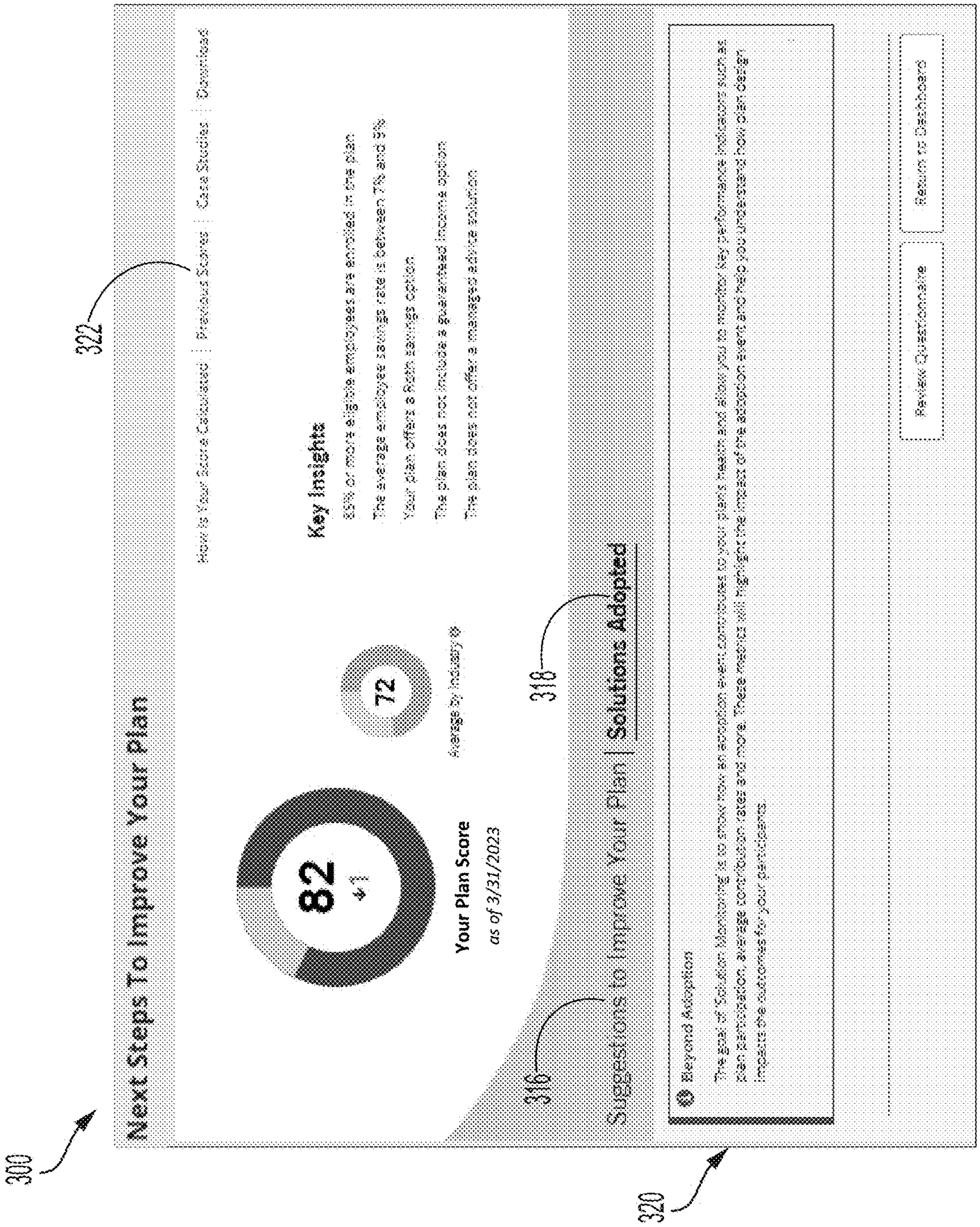

Summary screen 200 may include a control 214 or link to an improvements page or section of sponsor portal 116. For example, FIGS. 3A and 3B illustrate an improvements page 300 of sponsor portal 116 that opens following activation of control 214. In the specific implementation shown, improvements page 300 is an extension of summary screen 200 that opens below summary screen 200 following activation of control 214. In other implementations, improvements page 300 may be a separate page or area of sponsor portal 116. As shown, improvements page 300 includes two tabs: a suggestions tab 316 and an adopted solutions tab 318, which are illustrated in FIG. 3A and FIG. 3B, respectively, and described in further detail, below. In other implementations the various features and functions discussed below may be combined into a single tab/screen.

FIG. 3A illustrates improvements page 300 with the suggestions tab 316 selected. In certain implementations, improvements page 300 may include an improvements list 302 of selectable elements corresponding to suggested improvements for the benefit plan. For example, selectable element 304 includes the suggestion of offering a guaranteed income option. In response to plan sponsor user 118 selecting selectable element 304 (e.g., by clicking selectable element 304), a suggestion details area 306 may open with further details about the specific suggestion and its implications to plan metrics and the benefit plan's overall score. For example, in the illustrated example, suggestion details area 306 indicates that providing a guaranteed income option is predicted to increase deferral rates by 6% and plan balances by 19%.

Suggestion details area 306 includes other important information beneficial to the plan sponsor user 118. For example, suggestion details area 306 includes a link 308 to case studies (or other information, e.g., white papers) relevant to the selected suggestion. Suggestion details area 306 further includes additional controls related to the suggestion. For example, suggestion details area 306 includes a suggestion management button 309 and a modelling button 311. Suggestion details area 306 also includes an impact indicator 310 and an investment indicator 312 that simply yet effectively communicate the projected impact and cost, respectively, for implementing the suggested change to the benefit plan.

When activated, suggestion management button 309 for may present various options to a user regarding the currently selected suggestion. Among other things, such options may include hiding a suggestion, rating a suggestion, reprioritizing/reranking a suggestion (e.g., to change the order in improvements list 302), marking a suggestion for subsequent follow up, and the like. In certain implementations, suggestion management button 309 may only be available to representatives (e.g., financial advisors) associated with the plan administrator and that have access to an administrator version of sponsor portal 116. The representative can then use suggestion management button 309 and the options it provides to managing the currently selected suggestion based on the representative's interactions and information collected about the sponsor. By way of example, suggestion management button 309 may present an option to hide a given suggestion from a sponsor. If a suggestion is hidden, the suggestion will no longer appear in improvements list 302 when viewed by the sponsor but may appear with an indicator that the suggestion is hidden when viewed by a representative of the administrator. In FIG. 3A, for example, an icon 314 in the form of a crossed-out eye indicates that a suggestion to implement an emergency savings feature is currently hidden from sponsors. To unhide a suggestion, the representative may select the hidden suggestion from improvements list 302, activate suggestion management button 309, and select a corresponding option to unhide/show the suggestion.

Figure 4A:
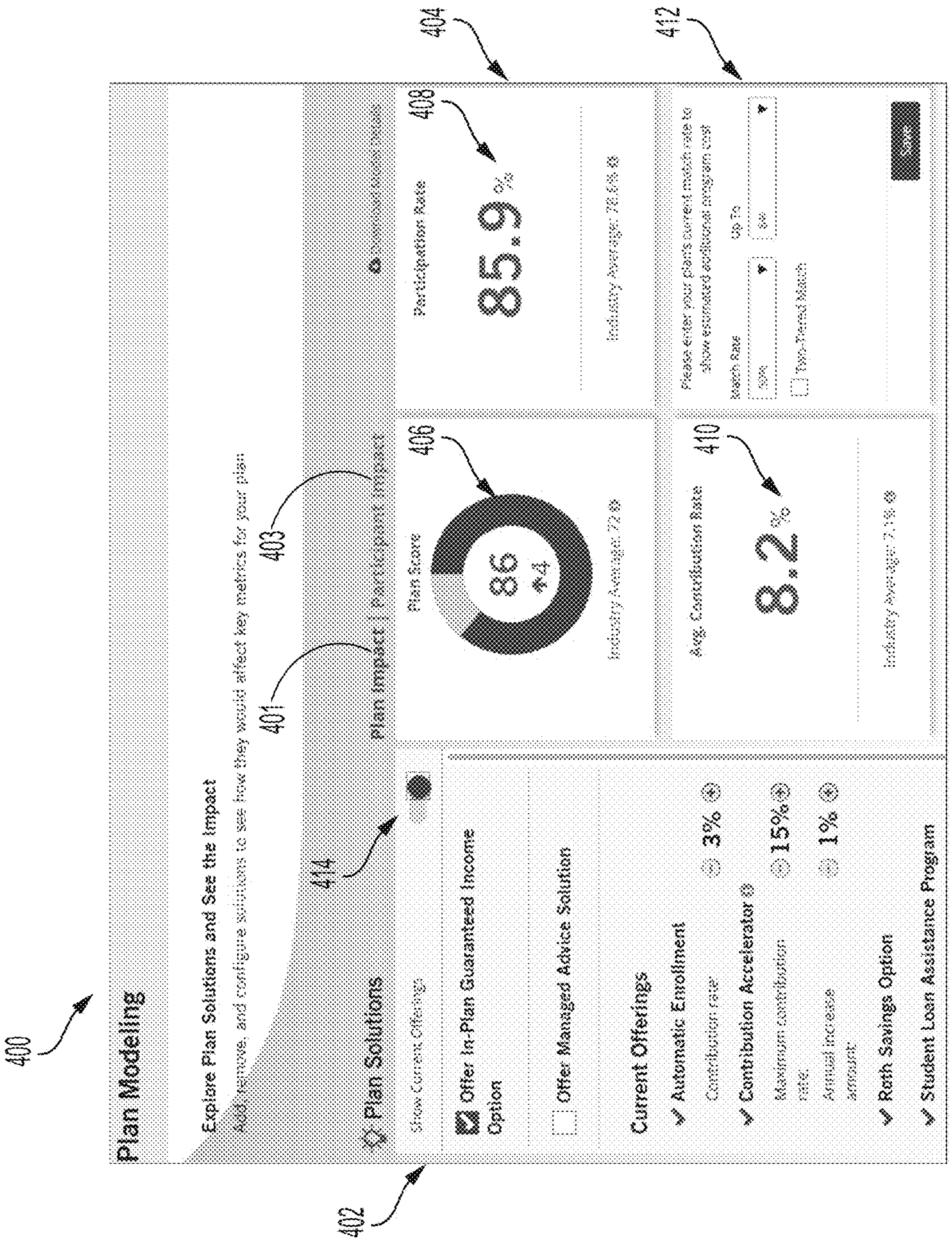
FIG. 4A shows an example modelling/simulation screen or section of the plan sponsor portal including predicted plan-level outcomes.

When activated, modelling button 311 may open a modelling page to illustrate the potential impacts of implementing the suggestion in further detail. FIG. 4A includes an example of a modelling page and is discussed below in further detail. In short, however, the modelling page allows a user to select and modify various plan parameters and options. The modelling page then presents predicted outcomes to plan metrics (e.g., the holistic plan score, participation rate, etc.) if the sponsor were to implement the changes. In certain implementations, when a sponsor accesses the modelling panel by activating modelling button 311, the modelling panel may open and modify with the settings of the modelling panel to reflect the suggestion.

Although not included in FIG. 3A, suggestion details area 306 may include other controls to facilitate analysis and implementation of suggestions. For example, in certain implementations, suggestion details area 306 or another part of improvements page 300 may include a button or other control for initiating communication with a plan administrator representative.

Referring back to improvements list 302, the specific suggestions included in improvements list 302 may be dynamically identified by benefit plan service 102. For example, in certain implementations, benefit plan service 102 may maintain a prioritized list of benefit plan conditions and may present one or more of the highest priority conditions not met by the current benefit plan. For example, in the context of a retirement benefit plan, the benefit plan conditions may include, from highest to lowest priority, (1) automatic enrollment; (2) a 5% employer match; (3) automatic contribution acceleration; and (4) availability of personal finance coaching. If the plan in question has a 5% or greater employer match and provides personal finance coaching, then improvements list 302 may include, in order, each of automatic enrollment and automatic contribution acceleration as suggestions.

In certain implementations, the prioritized list of options and conditions driving improvements list 302 may be ranked according to potential impact on key plan metrics, cost/investment to implement, or various other criteria. For example, improvements list 302 may be based on conditions or options ranked based on improvement in participation rate per dollar of investment, resulting in improvements list 302 presenting the most cost-effective options to plan sponsor user 118.

To the extent improvements list 302 relies on a predicted outcome of implementing a given change to the benefit plan, benefit plan service 102 may determine the predicted outcome in various ways. For example, a fixed impact value may be assigned to each potential option based on institutional knowledge, rules of thumb, etc. Alternatively, models and algorithms 138 of benefit plan service 102 may include a predictive model trained to generate an impact value for a given change to the benefit plan. For example, the predictive model may be trained using historical data for the current benefit plan and other benefit plans supported by benefit plan service 102, where the historical data includes whether benefit plans implemented a given option and the subsequent impact on one or more benefit metrics. Benefit plan service 102 may then use the predictive model to generate more accurate and dynamic predictions for the impacts of potential changes to the benefit plan, which in turn may inform which and in what order benefit plan service 102 populates improvements list 302 with suggestions for plan sponsor user 118. As additional data is collected over time, the predictive model may be periodically updated to continuously improve the predictive power of the model.

FIG. 3B illustrates improvements page 300 with adopted solutions tab 318 selected. With adopted solutions tab 318 selected, sponsor portal 116 may present an adopted solutions section 320 that provides a summary of previously adopted solutions/modifications made to the current plan and corresponding metrics on the impact of those solutions. In the example of FIG. 3B, no solutions have been adopted; however, adopted solutions section 320 may include a listing similar to that of improvements list 302 in which improvements page 300 provides a list of previously implemented solutions/suggestions. The list may include a brief description of the solution with each solution selectable to access more details regarding the solution and the impact of its implementation.

Depending on the nature of the adopted solution, the specific metric presented to illustrate the impact of the adopted solution may vary. In the context of a retirement benefit plan, for example, some solutions (e.g., offering a guaranteed income option) may have direct impact on deferral rates and plan balances and, as a result, adopted solutions section 320 may indicate changes to those specific metrics following a change to whether a guaranteed income option is being offered. As another example, a change in an employer match may affect participation rate and balances and adopted solutions section 320 may indicate changes in one or both of those metrics when a solution related to employer match is selected. Alternatively, or in addition to specific metrics, adopted solutions section 320 may indicate a change to the overall score assigned to the plan.

As noted above, adopted solutions section 320 may present adopted solutions in a list of adopted solutions, each of which may be selected to obtain more information for the selected solution. As another example, adopted solutions section 320 may present changes in plan metrics (including the holistic plan score) using a graphical or similar visual technique. For example, adopted solutions section 320 may include a time-based graph in which changes in plan score are presented over time. Such a graph may further include indicators for when the sponsor adopted certain solutions. The indicators may also be selectable to open or update a tooltip, pop-up, or other component of improvements page 300 to present additional details regarding the selected adopted solution.

Figure 3C:
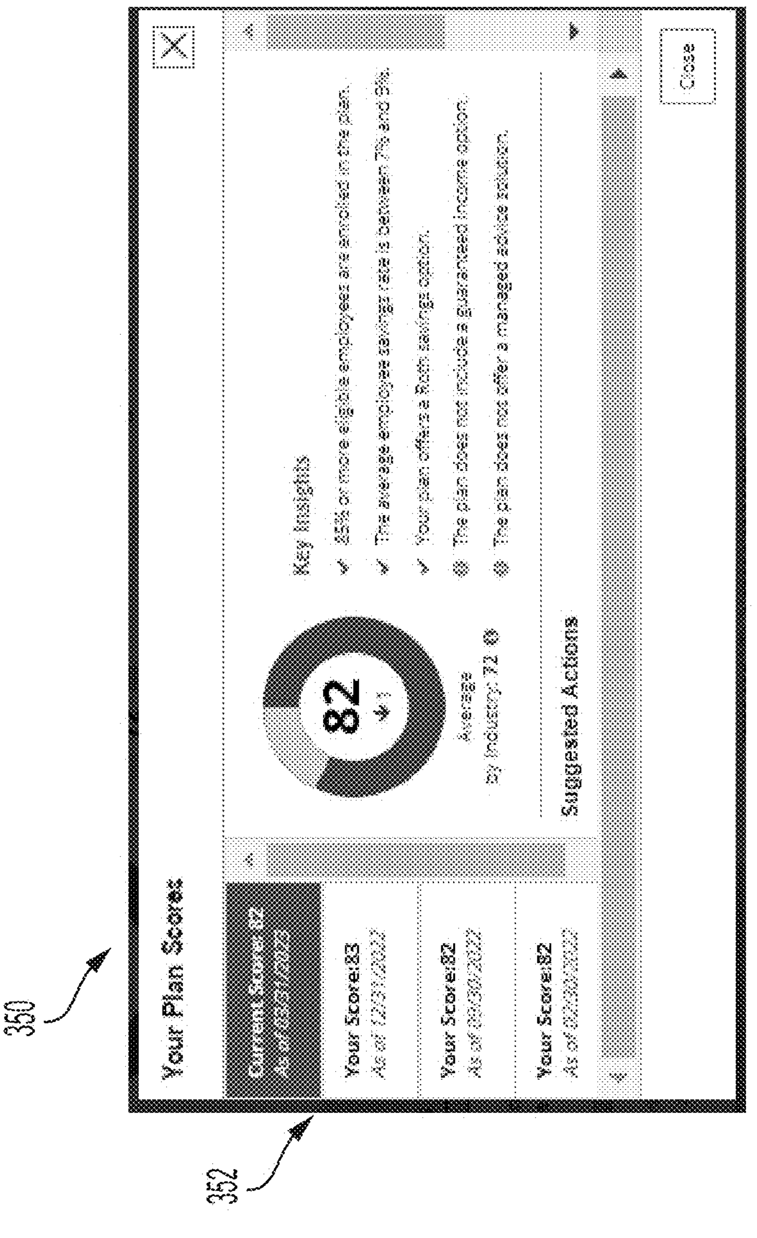
FIG. 3C shows an example score history pop-up or screen.

Improvements page 300 may also include a plan history link 322 to access historical information regarding the benefit plan. For example, in response to activating 322//, sponsor portal 116 may open a window, pop-up, page, etc. with historical plan metrics. FIG. 3C, for example illustrates a pop-up 350 including historical information for the example benefit plan. Pop-up 350 includes a list 352 of available "snapshots" and a details section 354. Each snapshot is indicated by a date of the snapshot and the score for the benefit plan as of the date. As shown, each snapshot in list 352 may be selected to update details section 354 to show summary information as of the date of the snapshot. In certain implementations, the details presented in details section 354 may be similar to those shown in summary screen 200 and may include a holistic score for the plan, changes in the score since the previous score calculation, a benchmark, and key insights regarding positive aspects of the plan and/or potential areas for improvement. Pop-up 350 may also display or provide access to histories of other historic plan metrics (e.g., participation rate, contribution rate, etc.). Similar to adopted solutions section 320, pop-up 350 may additionally or alternatively present historic plan data in a graph or other format, such as a time-based line graph illustrating the change in one or more plan metrics over time.

Figure 4B:
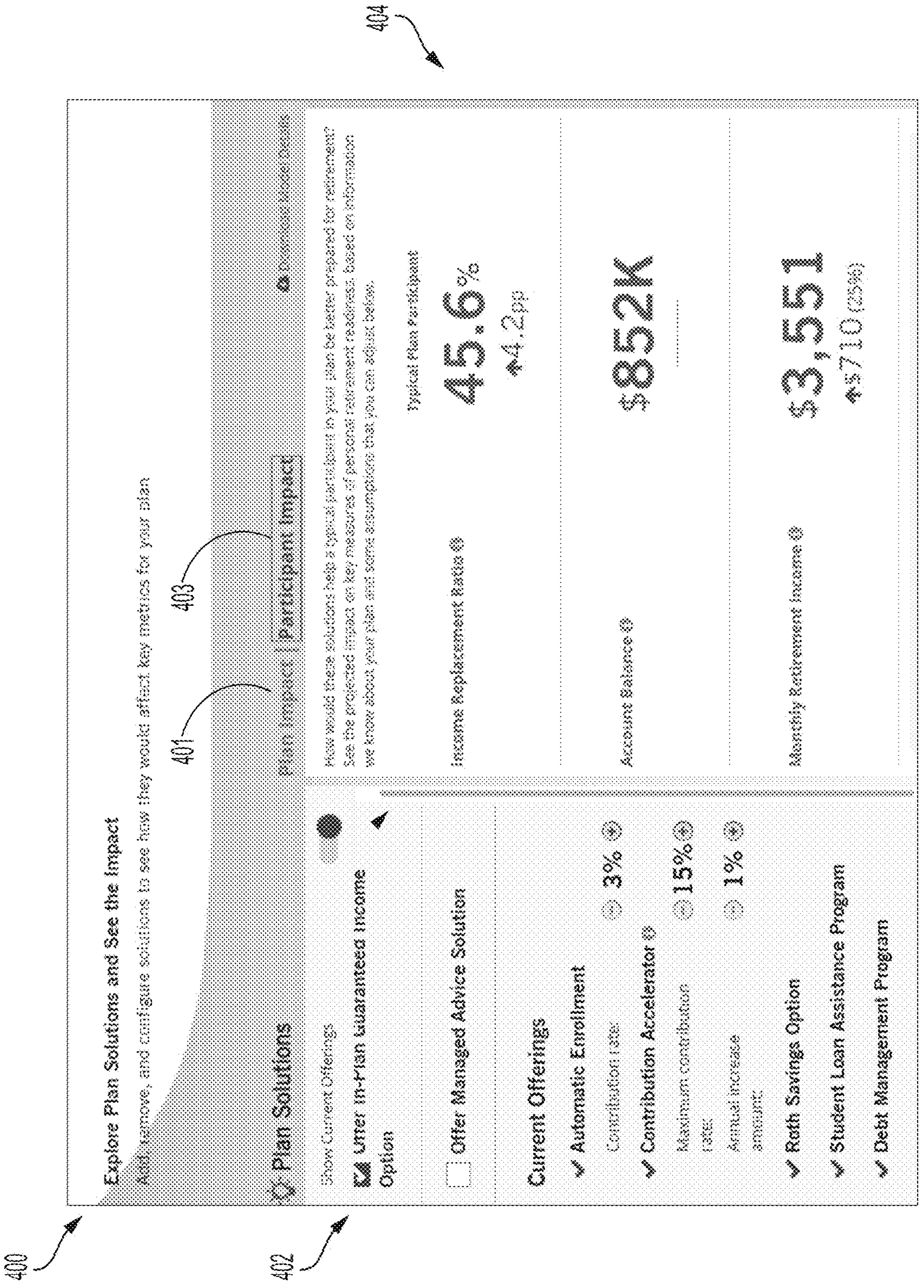
FIG. 4B shows an alternative view of the example modelling/simulation screen of FIG. 4A including predicted participant-level outcomes.

Sponsor portal 116 may further include a modelling and simulation screen 400, an example of which is illustrated in FIGS. 4A and 4B. As previously noted, benefit plan service 102 may include one or more predictive models trained on historical data collected by benefit plan service 102 and configured to predict changes to benefit plan metrics in response to implementing various changes to a given benefit plan. In addition to enabling dynamic plan recommendations, benefit plan service 102 may rely on such predictive models to provide an interactive module or page, such as that shown in modelling and simulation screen 400.

In the specific illustrated implementation, modelling and simulation screen 400 includes a plan solutions section 402 and a plan impact section 404. In the non-limiting example shown, FIG. 4A illustrates modelling and simulation screen 400 with a first tab 401 selected such that plan impact section 404 provides plan-level impact data. In contrast, FIG. 4B illustrates modelling and simulation screen 400 with a second tab 403 selected such that participant-level impact data is displayed in plan impact section 404.

Plan solutions section 402 includes various controls for modifying various parameters of the current benefit plan while plan impact section 404 includes various metrics based on the state of plan solutions section 402. During operation of modelling and simulation screen 400, changes to the controls of plan solutions section 402 may be reflected in score section 406 in substantially real time. For example, plan impact section 404 includes a score section 406 similar to score area 202 of summary screen 200 (shown in FIG. 2), which presents a holistic score for the current benefit plan modified according to the control settings of plan solutions section 402. Plan impact section 404 also includes a plan participation section 408 and a contribution rate section 410, which present predicted values for participation rate and contribution rate, respectively. Notably, in addition to displaying predicted values in each of score section 406, plan participation section 408, and contribution rate section 410, each of the sections further include a predicted change to the corresponding metric relative to metrics for the current plan design. In at least certain implementations, plan impact section 404 may also include a cost section that displays an estimated change in cost relative to the current plan should the sponsor implement the options in plan solutions section 402. More generally, plan solutions section 402 can include any plan parameters and corresponding modalities for modifying those plan parameters while plan impact section 404 may include graphics, text, or other elements explaining the potential impact of implementing the changes in plan solutions section 402.

Plan impact section 404 is also shown in FIG. 4 as including a match section 412 in which a sponsor may provide employer match details. In the specific context of retirement benefits, employer matches can have a substantial impact on the overall cost of a given benefit plan and, as a result, may be considered separately for further actuarial review. In other implementations, an employer match may be treated as another input to the predictive model underlying modelling and simulation screen 400. In such cases, controls for modifying the employer match may be maintained in match section 412 or may be placed in plan solutions section 402 like other parameters than can be modelled using modelling and simulation screen 400.

Plan solutions section 402 is illustrated in FIG. 4A as including a toggle 414. In the specific implementation illustrated in FIG. 4A, toggle 414 can be activated to modify the parameters presented in plan solutions section 402. For example, in certain implementations, when toggle 414 is in a first position, plan solutions section 402 may only include parameters and options corresponding to suggestions presented in improvements list 302 of improvements page 300 (shown in FIG. 3). In such instances, all other parameters and options for a plan being modelled may be maintained as they are in the current plan. In contrast, when toggle 414 is in a second position (e.g., as shown in FIG. 4A), plan solutions section 402 may include a broader range of parameters and options that user may modify.

As previously noted, FIG. 4B illustrates modelling and simulation screen 400 with second tab 403 selected such that plan impact section 404 presents participant level metrics based on the current model. Like the plan-level metrics, the participant-level metrics may be presented in absolute or relative terms and can include any metrics relevant to the benefit plan. For example, and as shown in FIG. 4B, when second tab 403 is selected to show participant impact, plan impact section 404 may be updated to show income replacement ratio, account balance, monthly retirement income, and similar metrics illustrating the impact of the proposed modifications tot eh benefit plan.

While FIGS. 4A and 4B illustrate plan solutions section 402 and plan impact section 404 as having generally fixed configurations, in other implementations plan solutions section 402 and plan impact section 404 may be customized. For example, modelling and simulation screen 400 and may include controls for selecting plan options and metrics of interest to customize the options presented in plan solutions section 402 and predictions presented in plan impact section 404, respectively.

Figure 5A:
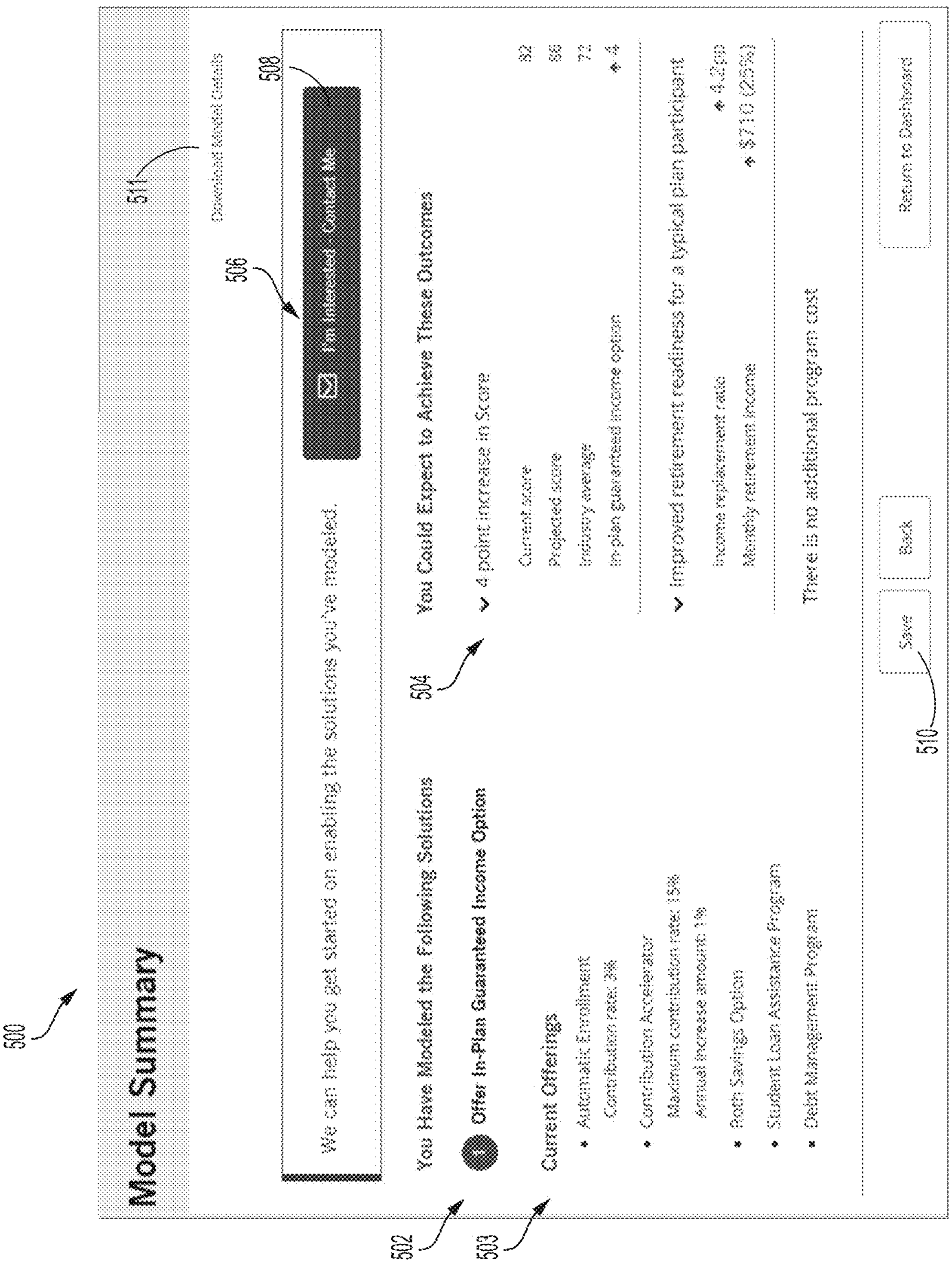
FIG. 5A shows an example model summary screen of the plan sponsor portal.
Figure 5B:
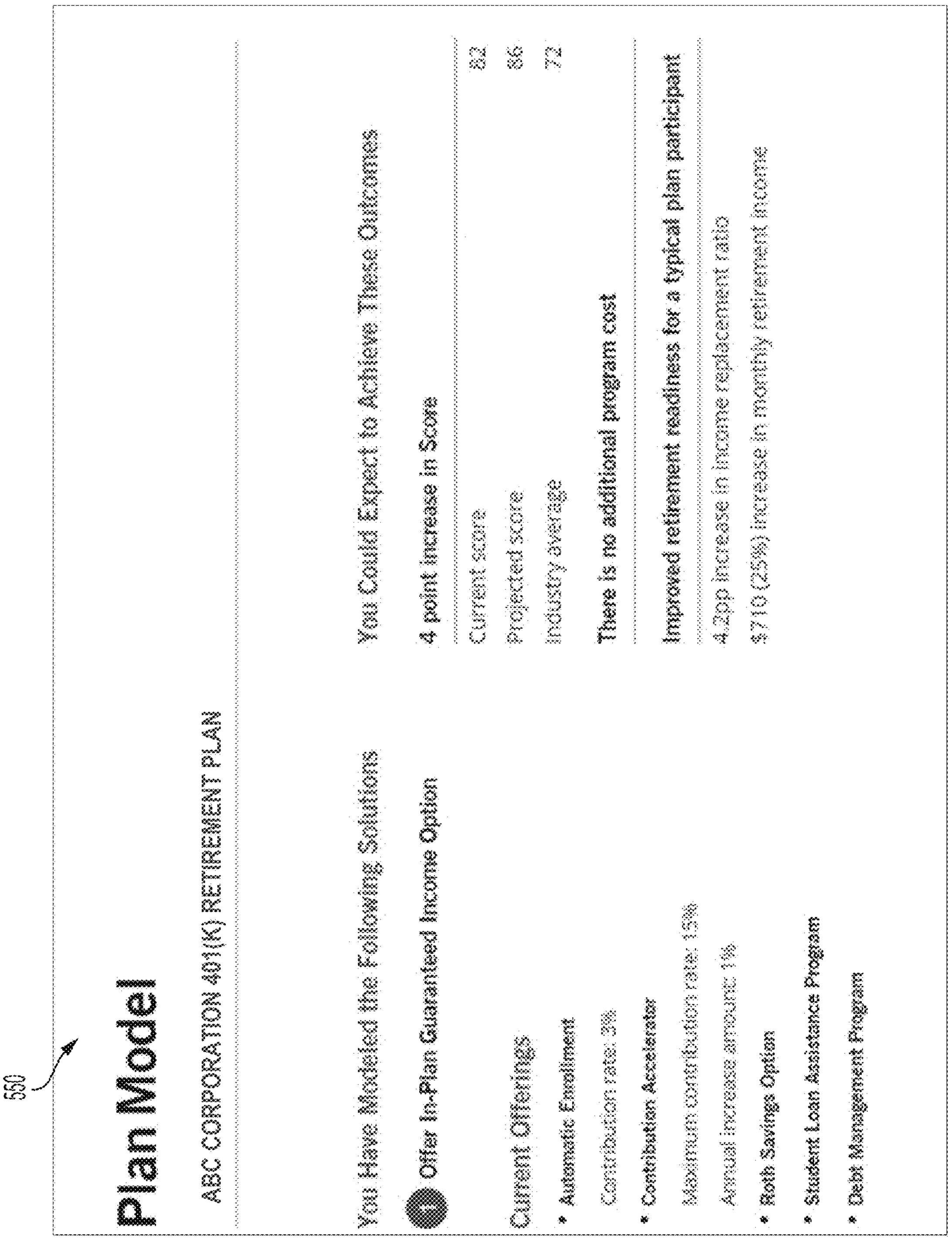
FIGS. 5B and 5C show an example model summary report that may be generated by the plan sponsor portal.
Figure 5C:
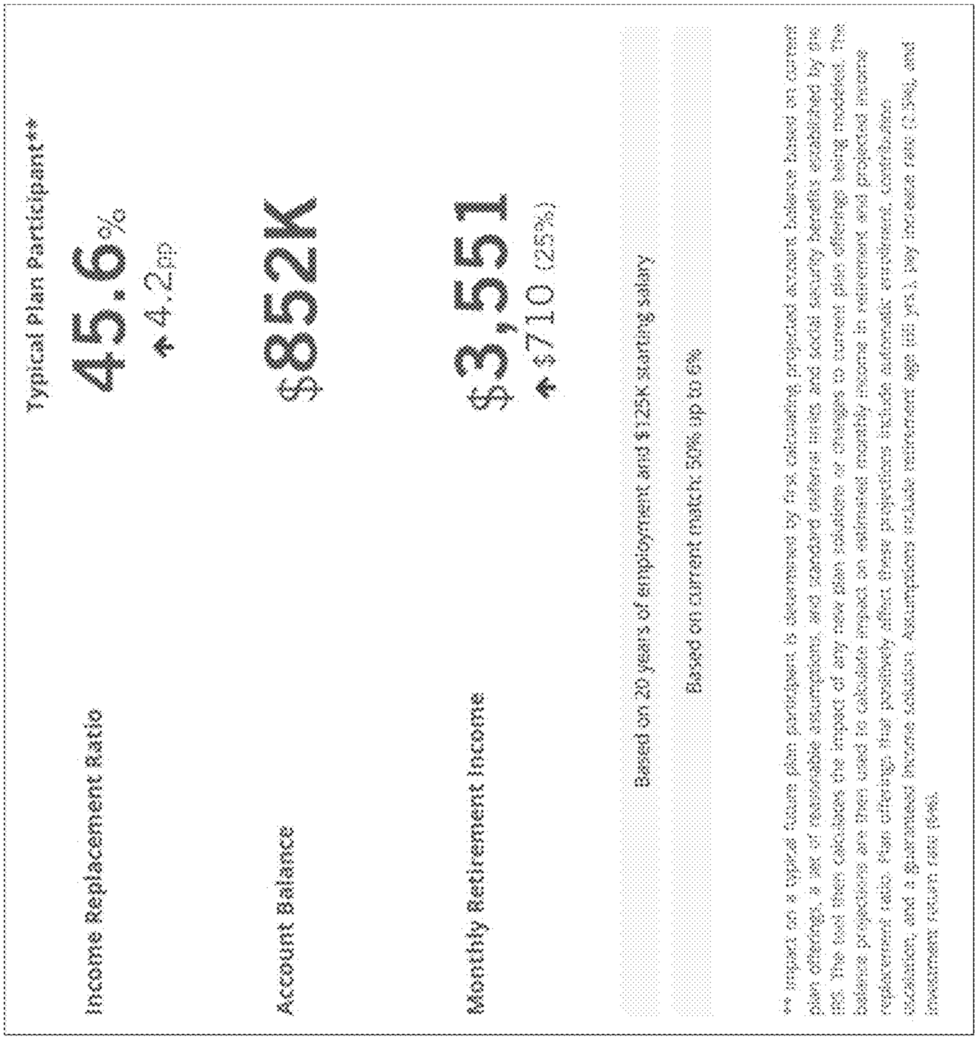

In certain implementations, modelling and simulation screen 400 may support plan sponsor user 118 saving, exporting, or generating a report for a given simulation created using modelling and simulation screen 400. Plan sponsor user 118 may also be presented with a model summary screen 500, as illustrated in FIG. 5A. As shown, model summary screen 500 includes a summary of the options selected by plan sponsor user 118 and the various impacts predicted if those changes were to be implemented. For example, model summary screen 500 includes an options section 502 listing the various modification modeled by plan sponsor user 118 and a current offerings section 503 indicating current aspects and parameters of the plan that remained unaltered in the modelled plan. Model summary screen 500 further includes a predicted impact section 504 detailing the outcomes that can be expected should plan sponsor user 118 implement the options identified in options section 502. Finally, model summary screen 500 includes a section 506 guiding subsequent action for plan sponsor user 118. Although section 506 may include other elements, in the specific implementation shown in FIG. 5A, section 506 includes a representative contact control 508 to initiate communication with a representative of the plan administrator and a save control 510 to save the model for later access and review.

In certain implementations, activation of representative contact control 508 may trigger one or more communication modalities between plan sponsor user 118 and a representative of the plan administrator. For example, in response to activation of representative contact control 508, benefit plan service 102 may initiate a phone call or chat session with a representative, generate and transmit an email or similar message to a representative, and the like. Activation of representative contact control 508 may further cause benefit plan service 102 to transmit a copy of the model created by plan sponsor user 118 or related summary data to the representative. By doing so, benefit plan service 102 provides basic information to the representative to guide subsequent communications regarding additional information and implementation of the modelled options.

Model summary screen 500 or modelling and simulation screen 400 may also include a link or control for a user to download the current model. For example, model summary screen 500 includes a download link 511 that, when activated, causes downloading of information corresponding to the modelled solution, such as a report. An example report 550 is provided in FIGS. 5B and 5C. In at least certain implementations, reports and model data may be downloaded in various formats, including those suitable for integration into other documents (e.g., other reports) or presentation/slide decks.

Figure 6B:
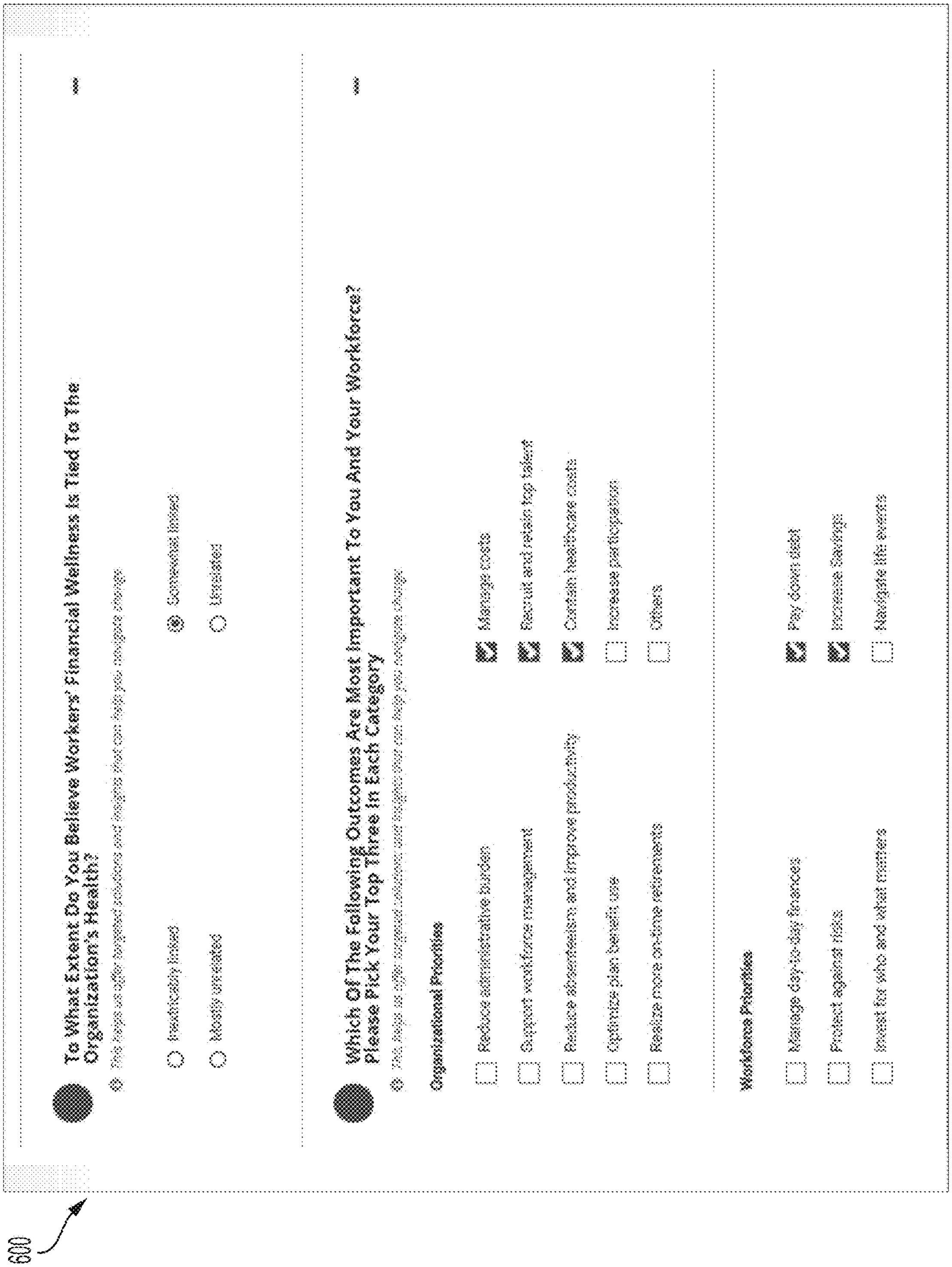
Figure 6C:

Sponsor portal 116 may also include various screens and sections dedicated to collecting information from sponsors. For example, benefit plan service 102 may present or otherwise make available quizzes, forms, questionnaires, etc. for completion by plan sponsors to provide more information about the plan sponsor, participants in the plan, and the like. In certain cases, benefit plan service 102 may use the collected information in scoring a sponsor's benefit plan. For example, benefit plan service 102 may consider other benefit plans offered by the sponsor when determining a score for the current benefit plan (e.g., benefit plan service 102 may consider whether a sponsor of a 401(k) plan provides additional retirement benefits, such as a pension/defined benefit plan). The information collected by benefit plan service 102 may alternatively or additionally be used to provide plan administrators with additional information regarding any anticipated changes or objectives for the plan sponsor. To that end, FIGS. 6A-6C, illustrate an example questionnaire 600 that may be presented by benefit plan service 102 to sponsors. For example, benefit plan service 102 may present questionnaire 600 to sponsors as part of an initial registration/onboarding process or may present questionnaire 600 to plan sponsor user 118 when plan sponsor user 118 first accesses or logs into sponsor portal 116.

In the specific example of questionnaire 600 the example questions shown in FIGS. 6A and 6B attempt to capture the sponsor's general policies, goals, plans, etc. related to the benefit plan. In certain implementation, such information may be maintained on file for reference by a plan administrator or advisor to help develop and refine the sponsor's plan. In contrast, FIG. 6C includes a listing of other benefits provided by the sponsor outside of the plan associated with benefit plan service 102. As discussed herein, such information may be used when calculating a score for the sponsor and, as a result, questionnaire 600 can be a basic modality through which a sponsor can provide supplemental benefit information or other information relevant to scoring.

In certain implementations, benefit plan service 102 may periodically present questionnaire 600 to plan sponsor user 118 to ensure that any information contained in questionnaire 600 remains accurate and up to date. Alternatively, benefit plan service 102 may periodically present a subset of questions from questionnaire 600 or ask for additional information from the sponsor. Benefit plan service 102 may also make questionnaire 600 or the information collected through questionnaire 600 available to plan sponsor user 118 such that plan sponsor user 118 may amend or supplement any provided information on his or her own initiative.

C. Score Calculation

As discussed above, implementations of the present disclosure include calculation and generation of a holistic score or similar metric indicating the effectiveness of a given benefit plan. Calculation of such a score includes evaluating various parameters and characteristics of the benefit plan, each of which contributes to a portion of the total score.

By way of example, a score may be based on a scale of 0-100 points and each parameter considered for the score may have a corresponding maximum potential score based on the parameter's relative importance to the benefit plan's effectiveness. In certain cases, a given parameter will have continuous or discrete values and may be evaluated across a range. In such cases, benefit plan service 102 may award no points when a value for the parameter is below a minimum threshold value, full points when the parameter value is at or exceeds a maximum threshold value, and partial points for values between the minimum and the maximum thresholds values (e.g., bases on a linear relationship). Certain parameters, such as whether a sponsor provides a supplemental or related benefit, may be binary in nature. Accordingly, benefit plan service 102 will either award full points or no points depending on whether the particular condition is met.

In one specific and non-limiting example, benefit plan service 102 may support a retirement benefit plan and may have the score breakdown indicated below in Table 1, which considers 14 distinct categories to provide a score from 0-100.

TABLE 1

Example scoring breakdown for retirement benefit plan

| Score Category | Contribution |
|---|---|
| 1. Employer/Employee Contribution Score | 18 points |
| 2. Spread Score between Median and Average Balance | 5 points |
| 3. Effectiveness Score (e.g., plan meets thresholds for both participation and savings rate) | 18 points |
| 4. Health Spending Account offering to augment retirement savings | 3 points |
| 5. In-plan Roth Savings offering | 5 points |
| 6. In-plan workplace Emergency Savings offering | 3 points |
| 7. Non-qualified plan offering to supplement executives' retirement income | 3 points |
| 8. Student Loan Assistance offering | 3 points |
| 9. Debt Management Credit/Program offering | 3 points |
| 10. Quantity and Quality of Employee Engagement | 18 points |
| 11. Effective utilization of in-plan lifetime income solution | 8 points |
| 12. Effective utilization of managed accounts | 5 points |
| 13. Overall loan activity and participants with multiple loan balances | 3 points |
| 14. Nondiscrimination testing stress score | 5 points |

With reference to Table 1, the various components of the example scoring system generally fall into categories related to the overall design of the benefit plan, access to related resources and programs, and engagement by participants. Notably, while the specific score categories listed in Table 1 are applicable to evaluating retirement plans, the more general categories of plan design, access, and engagement are also applicable to other implementations of this disclosure directed to non-retirement benefit plans, such as health and wellness or education-related benefit plans, as well as other types of financial plans, albeit with the specific score components tailored to the given application.

While the foregoing example relies on a scoring system form 0-100, this disclosure contemplates that benefit plan service 102 may instead rely on an alternative system. For example, benefit plan service 102 may provide a score using a grade system (e.g., from an F indicating a plan with poor effectiveness to an A indicating a plan with exceptional effectiveness), a color-based system (e.g., with red indicating poor effectiveness and green indicating good effectiveness), or any other suitable system that meaningfully conveys the relative effectiveness of a sponsor's benefit plan. Accordingly, benefit plan service 102 may generally include algorithms, tables, etc. for converting calculated numerical scores into other scoring systems.

For a given benefit plan, benefit plan service 102 may calculate a corresponding score on a periodic basis (e.g., monthly, quarterly, bi-annually, annually, etc.) or in response to a request for an updated score from a plan sponsor. To do so, benefit plan service 102 may access relevant data (e.g., as stored in data sources 128-134 and 140) and apply the weighting and scoring system for the benefit plan.

Benefit plan service 102 may perform periodic scoring for multiple benefit plans that it supports and, as a result, can generate one or more benchmark scores. The benchmark score may be an average or other statistical measure (e.g., median) of all of the scores for benefit plans supported by benefit plan service 102. Alternatively, the benchmark score can be based on a subset of benefit plans. For example, a benchmark may be based on scores for competitors of a sponsor or organizations in the same or similar industry as the sponsor, organizations of comparable size (by headcount and/or financially) to the sponsor, and the like. Benefit plan service 102 may also generate multiple benchmarks that can be simultaneously presented to or otherwise accessed through sponsor portal 116. For example, summary screen 200 of FIG. 2 includes benchmark area 210, which in turn includes an industry-based benchmark.

The scoring breakdown provided above in Table 1 is intended as a non-limiting example of a scoring methodology that may be used in implementations of this disclosure. Stated differently, the factors listed in Table 1 may be modified by, among other things, adding one or more new score components to the list, removing one or more score components from the list, or modifying the contribution/weight of one or more score components. As a non-limiting example, additional factors that could be included in the scoring methodology may be a risk assessment score, a bias testing score, and a regulatory compliance testing score. Moreover, while the example of Table 1 is based on a 100-point scoring system, implementations of this disclosure are not limited to scoring on such a scale. Rather, aspects of this disclosure can be readily modified to support any suitable scoring methodology and to include any suitable factors underlying a given methodology.

As noted above, the various scoring categories listed in Table 1 generally relate to plan design, access, and engagement. Such factors are applicable to employer-sponsored benefit plans, including those unrelated to retirement. For example, in one non-limiting example of an implementation directed to scoring health and wellness plans, scoring components related to plan design may include the types of insurance included in the plan (e.g., medical, vision, dental), access to health- and wellness-related educational materials and programs, and measures of employee engagement with a program-related portal or account.

As another example, in the context of an implementation directed to evaluating personal finance-related programs, contributing factors related to plan design may include products and services included in the plan (e.g., access or subsidized fees for tax preparation services, debt consolidation services, investment management and advising services, budgeting and planning software/services, account and transaction services, etc.). Scoring of the personal finance program may also include access to financial education articles, personal finance seminars/webinars, coaching and mentoring, and similar resources related to personal finance education and financial literacy. Scoring of the personal finance-related benefit may also include whether and how often participants use, access, or otherwise engage with products and services available through the program, the supplemental resources, or other aspects of the program. In yet another example of a debt solution benefit, factors related to plan design may include whether a benefit plan includes loan analysis services (e.g., coaching and advising services related to debt management and repayment) and employer contribution plans for loan repayment (e.g., student loan repayment plans including employer contributions). Such programs may further be scored based on the availability of resources such as informational materials related to debt management and repayment, courses and learning modules related to debt management and planning, seminars/webinars or other multimedia content related, interactive planning tools and modules, and the like. Once again, plan participant engagement may also be considered in the score and may be based on whether and how frequently participants use the available benefits, access the educational resources, or otherwise engage with a platform related to the debt solution benefit.

This disclosure also contemplates that benefit plan service 102 may evaluate a given benefit plan for conformance to regulatory and tax requirements, such as those directed to ensuring non-discrimination and unbiased administration in benefit plans. For example, some types of plans must generally satisfy non-discrimination tests established by regulating bodies. Among other things, such tests may be directed to ensuring that both highly and non-highly compensated employees within an organization are contributing and participating in the benefit plan within certain proportional ranges and that assets within the plan are not overwhelmingly held by key employees within the organization. Accordingly, benefit plan service 102 may be configured to assess whether a given benefit plan meets regulatory/tax requirements and, if not, to provide recommendations on how a plan may be modified to conform to such requirements. Benefit plan service 102 may be configured to administer tests for requirements and, in certain implementations, may be configured to periodically request, retrieve, or otherwise be updated from external sources to capture any changes to requirements.

D. Calculating Score Based on Resource Usage by Participants

As noted in Table 1, benefit plan service 102 may calculate scores based, in part, on quantity and quality of employee/participant engagement with the benefit plan and related resources. So, for example and among other things, benefit plan service 102 may track what sections and resources of participant portal 122 are accessed by participants, how frequently participants are accessing aspects of participant portal 122, how long participants are engaging with resources, and the like, and may rely on such data when calculating a score for a given benefit plan.

In certain implementations, benefit plan service 102 may only track activity related to certain resources for purposes of determining participant engagement. For example, in the context of a retirement plan benefit, many participants may only access portions of participant portal 122 for viewing the participant's account balance and managing investments despite participant portal 122 including educational information, interactive modules, financial coaching, and other similar resources. In such cases, benefit plan service 102 may not consider the former, account-related activity to qualify as active engagement and instead determine engagement based on interaction, access, etc., by participants with the supplemental content available through participant portal 122.

Figure 7:
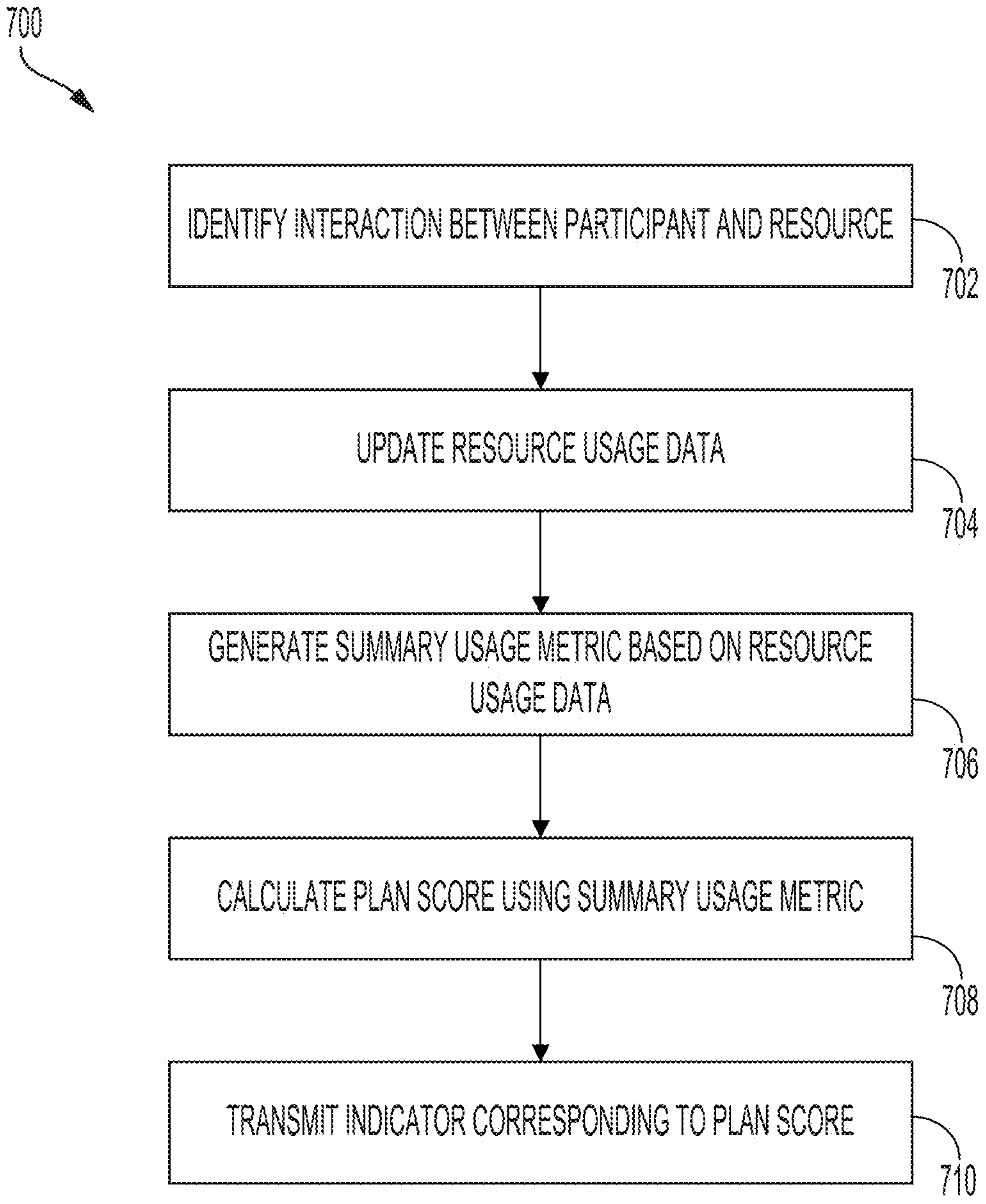
FIG. 7 shows an illustrative example of a process for logging participant interactions with resources provided through a participant portal and calculating a plan score based, in part, on the interactions.

FIG. 7 shows an illustrative example of a process 700 for generating a benefit plan effectiveness metric based in part on interaction with resources provided through a participant portal. The process 700 may be performed, for example, by a computing device associated with benefit plan service 102.

At step 702, benefit plan service 102 identifies an interaction between a user of participant portal 122 (e.g., plan participant user 124) and an online resource available through participant portal 122.

The online resource provided through participant portal 122 and the nature of the corresponding interaction can vary in implementations of this disclosure. As a first example, the online resource may be a page or section of participant portal 122 and the interaction between plan participant user 124 and the online resource includes the user accessing the page. As a second example, the online resource can be an external resource (e.g., a website) accessible by a link presented in participant portal 122 and the interaction between plan participant user 124 and the online resource includes the user activating the link. As a third example, the online resource may be an interactive module (e.g., an interactive calculator, tool, game, lesson/course, etc.) and the interaction between plan participant user 124 and the online resource may include plan participant user 124 operating or using the interactive module. As a fourth example, the online resource may be playable media (e.g., a video or audio) and the interaction between plan participant user 124 and the online resource may include playing the playable media. As a fifth example, the online resource may be a form and the interaction between plan participant user 124 and interaction with the online resource may include the user completing the form. As a sixth example, the online resource may be a user profile and the interaction between the user and the online resource may include plan participant user 124 completing (in whole or in part) the user profile. As a seventh example, the online resource may be a communication modality (e.g., video calls, voice calls, chat, email, instant messaging) supported by participant portal 122 for use in facilitating communication between an advisor/representative of the plan administrator and plan participants. Interactions in such cases may including sending and/or receiving communications using the supported modality.

In certain implementations, benefit plan service 102 may include monitoring or tracking functionality for use in identifying interactions between plan participant user 124 and a resource of participant portal 122. For example, in response to plan participant user 124 accessing participant portal 122, participant portal system 108 may log when plan participant user 124 interacts with certain resources and may further record information regarding the nature of the interaction. Accordingly, at step 704 and in response to identifying the interaction of step 702, benefit plan service 102 updates resource usage data. In at least some implementations, such data may be maintained in a corresponding data source, such as plan resource data source 132 of FIG. 1.

At step 706, benefit plan service 102 generates a summary usage metric based on the collected resource usage data. The summary usage metric can be any suitable metric that distills resource usage activity into a meaningful metric. By way of non-limiting example, the summary usage metric may include a total number of interactions with resources across all participants, a percentage of participants that interacted with a resource, a percentage of participants that interacted with multiple resources or resources multiples times, a percentage of participants that interacted with resources for more than a threshold amount of time, or other similar metrics that quantify interactions between participants and resources provided through participant portal 122.

At step 708, benefit plan service 102 calculates a plan score using the summary usage metric. For example, as noted above, benefit plan service 102 may consider multiple factors when calculating a score for a given benefit plan and such factors may include interaction between participants and resources provided by participant portal 122 as a measure of how effectively the portal and benefit plan resources are being used by participants. Accordingly, benefit plan service 102 may calculate a contribution to the benefit plan score based on the summary usage metric. For example, participant resource usage may be allocated a total of 5 out of 100 points for the score. If fewer than 25% of participants interacted with resources provided, benefit plan service 102 may award 0 points, full points if 75% or more of participants interacted with resources, and an intermediate value (e.g., based on a linear fit) between 0 and 5 points if between 25% and 75% interacted with the resources. Notably, multiple summary usage metrics may be considered by benefit plan service 102 with each summary usage metric contributing to a portion of the allocated points.

As previously noted in the context of scoring, benefit plan service 102 may also calculate the score for the benefit plan based on other data including, but not limited to, one or more of stored parameter values characterizing the benefit plan, stored data regarding additional benefits provided by the plan sponsor, and other participant metrics (e.g., participation or contribution rates).

At step 710, benefit plan service 102 transmits an indicator corresponding to the plan score in response to plan sponsor user 118 accessing sponsor portal 116 for the benefit plan using plan sponsor computing device 120. When plan sponsor computing device 120 receives the indicator, the indicator causes plan sponsor computing device 120 to display the plan score to plan sponsor user 118 through sponsor portal 116.

E. Dynamic Scoring Ranges

Scoring in implementations of this disclosure generally involves benefit plan service 102 evaluating various factors, each of which contributes to a total score. Stated differently, benefit plan service 102 obtains parameter values for various benefit plan parameters. Benefit plan service 102 then calculates a partial score based on the parameter value, where the partial score is based on a weight (e.g., a total possible points) assigned to the particular factor. Benefit plan service 102 then combines all of the partial scores to generate a final score reflecting the general effectiveness of the benefit plan in question.

In certain implementations of this disclosure, scoring may be based on a static system where the weights and ranges for parameters are fixed. Alternatively, administrators of the benefit plan may be authorized to modify the parameters/factors considered, the ranges for the parameters (e.g., the minimum value below which no points are awarded and the threshold for obtaining maximum points), the weights assigned to the different parameters, and other aspects of the scoring system.

In still other implementations, the scoring system may be dynamic and the parameters considered, ranges for the parameters, and/or weightings assigned to the parameters may be modified over time based on a scoring model. The scoring model is configured to receive historical benefit plan data, to determine whether and to what extent different benefit plan parameters affect the effectiveness of the benefit plan, and to output a modified set of scoring parameters reflecting the model's determination. For example, the model may be trained to identify which parameters are most relevant to plan participation and may output a set of scoring parameters that include the most influential benefit plan parameters. The model may also identify the most influential benefit plan parameters and more heavily weigh those parameters when calculating scores. Similarly, to the extent the model identifies a parameter, the model may also determine a relevant range of values for the threshold. For example, the model may determine lower and upper bounds for a parameter outside of which any change to the parameter results in minimal changes to a benefit plan metric, such as plan participation. The lower and upper bounds may then be used to define the range for calculating a partial score for the parameter in question. By way of non-limiting example, the model may determine, based on historical benefit plan data collected by benefit plan service 102, that an employer contribution below 1% has little to no impact on plan participation and that the additional participants enticed by an employer contribution above 5% begin to diminish. In such cases, 1% may be set as a lower bound (i.e., a value below which no points are awarded) and 5% as an upper bound (i.e., a value at or above which full points are awarded) for an employer contribution parameter used in scoring a benefit plan.

Figure 8:
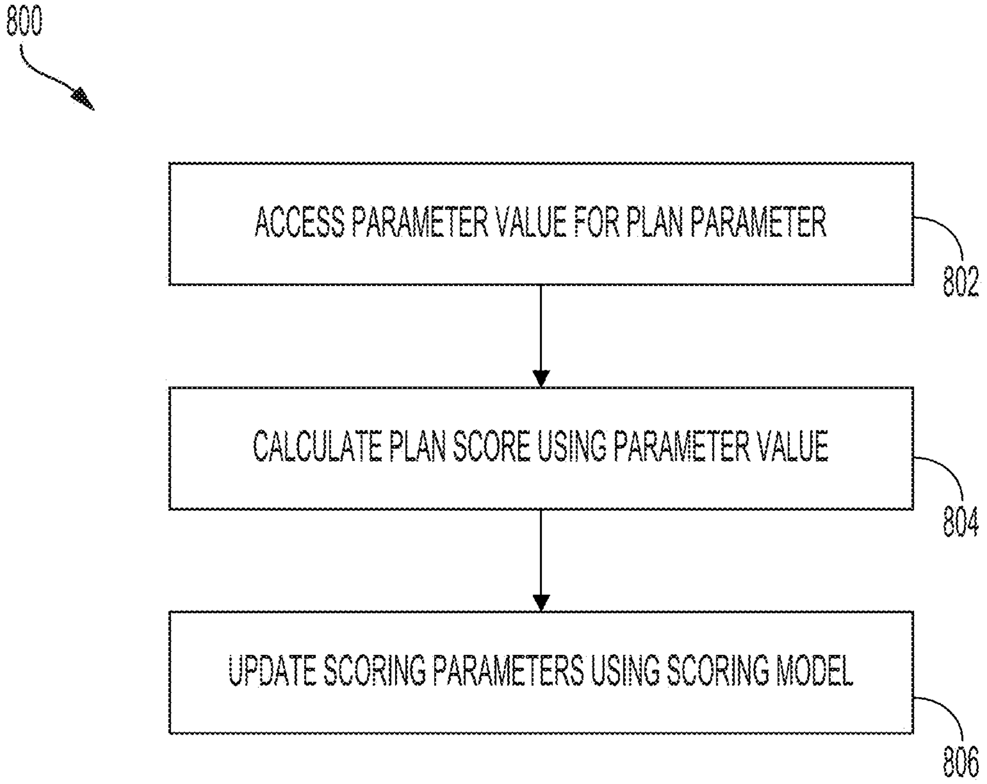
FIG. 8 shows an illustrative example of a process for dynamically modifying a benefit plan scoring methodology.

FIG. 8 shows an illustrative example of a process 800 for dynamically modifying a scoring system for benefit plans using a scoring model trained on historic benefit plan data. The process 800 may be performed, for example, by a computing device associated with benefit plan service 102.

At step 802, benefit plan service 102 accesses a parameter value for a plan parameter of a benefit plan.

At step 804, benefit plan service 102 calculates a plan score for the benefit plan. Calculating the plan score includes scaling the parameter value to a parameter range for the parameter value to generate a scaled parameter value and calculating a partial score for the scaled parameter value based on a weight assigned to the parameter.

At step 806, benefit plan service 102 updates scoring parameters for calculating the plan score using a scoring model. The scoring model is trained on historic benefit plan data for multiple benefit plans supported by benefit plan service 102. The scoring model is then used by benefit plan service 102 to receive historic benefit plan data for the benefit plan and to provide updated values corresponding to the benefit plan for one or more scoring parameters. Among other things, those scoring parameters may include which benefit plan parameters to consider when scoring a benefit plan, the relevant range of values for each parameters (e.g., a minimum and/or maximum value for scoring the parameter), and the weight assigned to each parameter.

F. Modelling and Predicting Benefit Plan Outcomes

In various implementations of this disclosure, sponsor portal 116 includes various features that include predicting the outcomes of changes to benefit plans. For example, improvements page 300 (shown in FIG. 3) includes an improvements list 302 in which proposed modifications to a benefit plan are presented to a plan sponsor. As previously discussed, benefit plan service 102 may generate improvements list 302 by using one or more predictive models to determine the outcome of implementing different modifications and then selecting the improvements with the best predicted outcomes (e.g., the highest impact, the highest impact per unit of investment, etc.) for presentation to the sponsor. Modelling and simulation screen 400 (shown in FIG. 4) relies on similar predictive models, albeit in response to modifications proposed by the sponsor through a modelling interface. More specifically, a plan sponsor interacts with various controls presented in plan solutions section 402 to generate a proposed modified benefit plan. Benefit plan service 102 then provides parameters for the proposed modified benefit plan to one or more predictive models that output predicted metrics for the proposed modified benefit plan. For example, in the context of a retirement benefit plan, the sponsor may use plan solutions section 402 to simulate enabling automatic enrollment and increasing a company match rate. Based on the modified parameters, the predictive model may then provide a predicted holistic score (e.g., a general effectiveness score), a predicted participation rate, and/or a predicted contribution rate, each of which may be presented in modelling and simulation screen 400.

Figure 9:
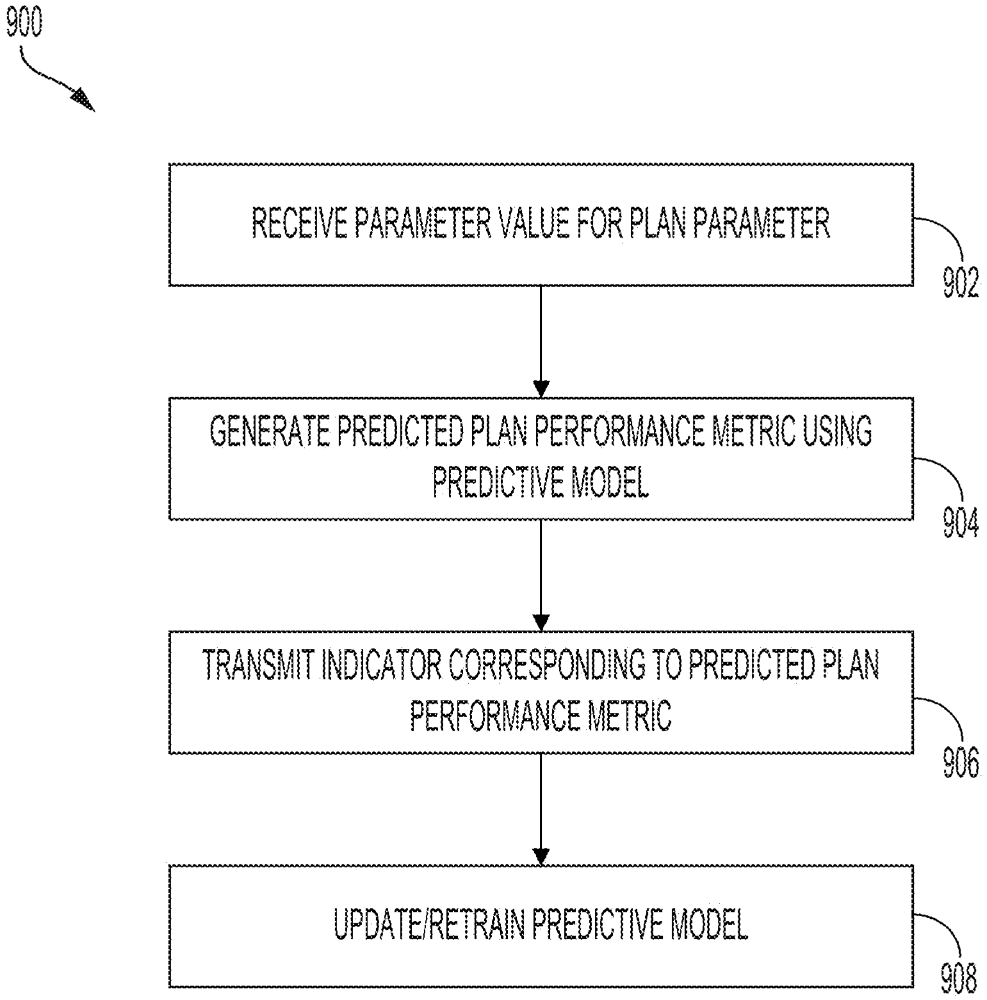
FIG. 9 shows an illustrative example of a process for predicting change to benefit plan performance metrics based on proposed modifications to a current benefit plan.

Considering the foregoing, FIG. 9 shows an illustrative example of a process 900 for modelling changes to benefit plans. The process 900 may be performed, for example, by a computing device associated with benefit plan service 102.

At step 902, benefit plan service 102 receives one or more proposed values for parameters of a benefit plan, where each of the proposed values differs from a current value for the same parameter. In certain implementations, benefit plan service 102 receives the proposed values from a modelling interface, such as that illustrated modelling and simulation screen 400. More specifically, plan sponsor user 118 may access modelling and simulation screen 400 and proposed modifications to plan parameters using the controls provided in plan solutions section 402. In response to proposed modifications made in plan solutions section 402, sponsor portal system 106 may transmit the values in plan solutions section 402 to benefit plan service 102. Alternatively, sponsor portal system 106 may transmit the values to benefit plan service 102 in response to receiving a command from plan sponsor user 118 to run/update a benefit plan simulation. Alternatively, in implementations in which benefit plan service 102 generate recommendations, benefit plan service 102 may access recommended values for various benefit plan parameters and the recommended values may be considered proposed values for those parameters.

Regardless of how the proposed values are obtained, benefit plan service 102 may generate a modified benefit plan using the proposed values. To the extent proposed values are not provided for particular parameters, benefit plan service 102 may use the current/actual value for those parameters.

At step 904, benefit plan service 102 generates a predicted plan performance metric. More specifically, benefit plan service 102 provides the parameters for the proposed benefit plan to a predictive model. The predictive model receives an input vector including benefit plan parameter values and outputs one or more predicted plan performance metrics. To do so, the predictive model can be trained using historical benefit plan parameter values as inputs and historic benefit plan performance metrics as outputs.

The predicted plan performance metrics provided by the predictive model may vary. Nevertheless, in certain implementations, the predicted plan performance metrics for the modified benefit plan may include one or more of a holistic score for the modified benefit plan, a participation rate for the modified benefit plan, a change in a participation rate for the modified benefit plan relative to the current benefit plan, a cost for the modified benefit plan, a change in cost for the modified benefit plan relative to the current benefit plan, an average amount of participation for the modified benefit plan, and/or a change in an average amount of participation for the modified benefit plan relative to the current benefit plan.

At step 906, benefit plan service 102 transmits an indicator corresponding to the one or more predicted plan performance metrics. When the indicator is received by a computing device, such as plan sponsor computing device 120, the indicator causes the user computing device to present the one or more predicted plan performance metrics. For example, in the context of modelling and simulation screen 400, the indicator may cause an update to plan impact section 404 that causes the various sections of plan impact section 404 to reflect the predicted plan performance metrics. In the context of improvements page 300, the indicator may cause the computing device to update suggestion details area 306 to display the predicted plan performance metrics. For example, as shown in FIG. 3, suggestion details area 306 includes text and visual indicators noting that "Average Contribution rate could increase by 2%" and that "This could increase your score by 6 points".

At step 908, benefit plan service 102 updates the predictive model using historical benefit plan parameter values and corresponding historic benefit plan performance metrics. As noted in the context of FIG. 1, benefit plan service 102 collects and maintains a range of data pertaining to benefit plans supported by benefit plan service 102. Benefit plan service 102 collects that data over time such that, when a sponsor modified a benefit plan, benefit plan service 102 also has access to data indicating changes to plan performance metrics subsequent to the modification. Such historical plan parameter and plan performance data can therefore be used to train and update the predictive model to improve the accuracy and efficiency of the predictive model over time. In one specific implementation, benefit plan service 102 may regularly supplement and update a collection of training data (e.g., training data source 136) and may retrain its predictive models on a periodic basis (e.g., monthly, quarterly, semi-annually, annually, etc.) to improve the effectiveness of the predictive models and to dynamically capture any broader dynamics (e.g., macroeconomic factors) that may affect plan performance.

G. Dynamic Benefit Plan Benchmarking

Previous sections of this disclosure note that benefit plan service 102 may perform benchmarking functions. For example, in addition to calculating and presenting a benefit plan score to a sponsor through sponsor portal 116, benefit plan service 102 may also present a benchmark score to provide additional context. The benchmark score may be calculated on a global level (e.g., based on all benefit plans supported by benefit plan service 102) or may be limited to a subset of benefit plans supported by benefit plan service 102. For example, benefit plan service 102 may calculate the benchmark for a specific industry or organization size (e.g., by personnel or financial metrics).

To provide meaningful benchmarks, benefit plan service 102 may be configured to periodically recalculate one or more benchmarks. For example, benefit plan service 102 may calculate new benchmarks every quarter (or other time period) taking into account data collected over the preceding quarter (or other timer period). As previously mentioned, benefit plan service 102 may also calculate individual scores for benefit plans on a similarly periodic basis. Accordingly, in some implementations, benefit plan service 102 may calculate both individual plan scores and benchmarks during a common updating process such that the benchmarks reflect the most recently calculated scores.

Figure 10:
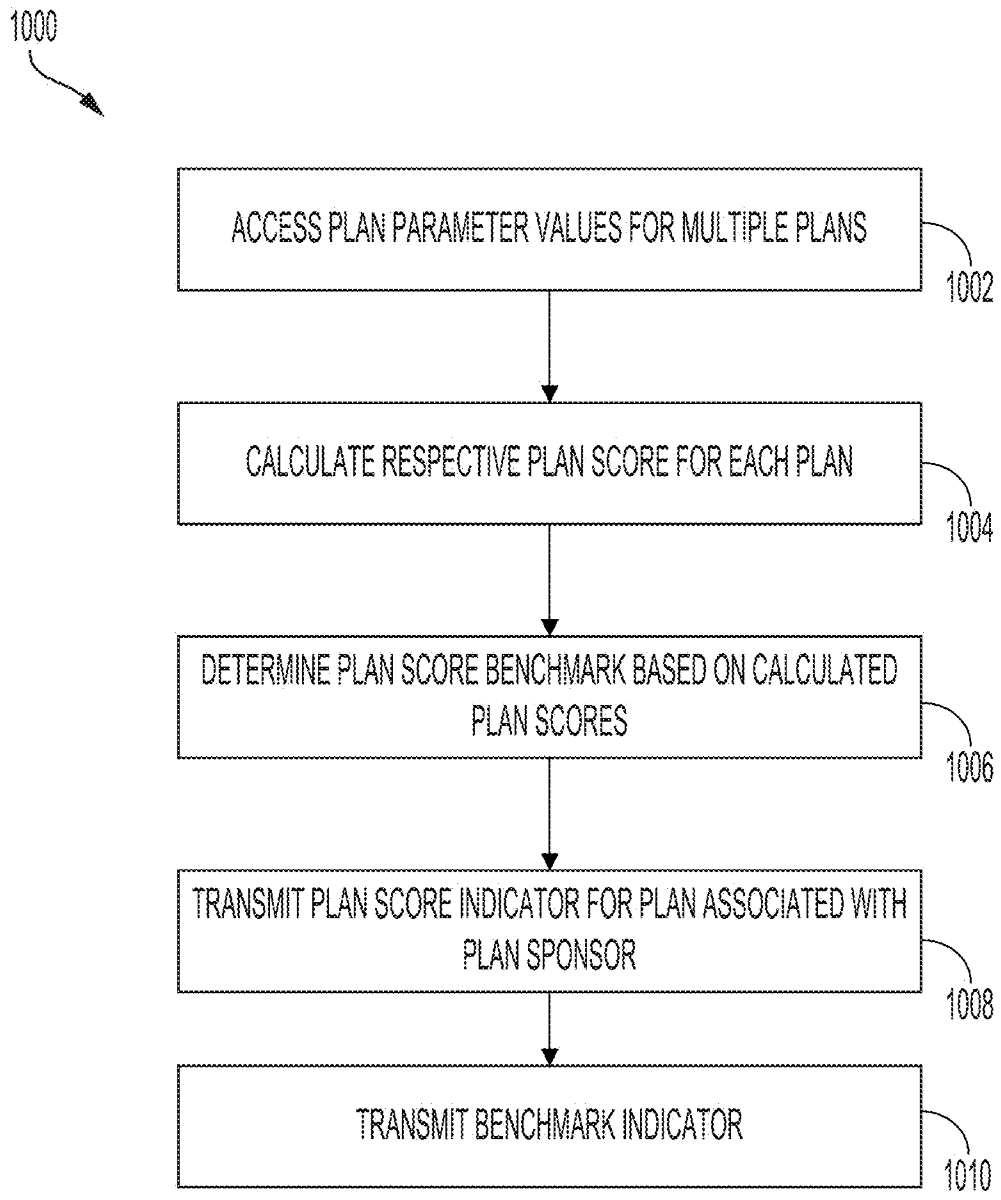
FIG. 10 shows an illustrative example of a process for dynamically updating benefit plan benchmarks.

FIG. 10 shows an illustrative example of a process 1000 for updating system benchmarks. The process 1000 may be performed, for example, by a computing device associated with benefit plan service 102.

At step 1002, benefit plan service 102 accesses plan parameter values for multiple benefit plans.

At step 1004, benefit plan service benefit plan service 102 calculates a respective plan score for each of the benefit plans using the plan parameter values obtained in step 1002. As previously discussed in this disclosure, calculating a plan score for a specific benefit plan includes accessing parameter values for multiple parameters of the benefit plan (as done in step 1002) and subsequently computing a single score based on the parameter values, where each parameter is assigned a particular weight. Score contributions for certain parameters may also be based on a range for the parameter.

At step 1006, benefit plan service 102 determines a plan score benchmark based on the various plan scores calculated in step 1004. For example, benefit plan service 102 may calculate the plan score benchmark from a statistical measure (e.g., mean, median) of all the calculated scores. Benefit plan service 102 may also calculate the plan score benchmark using a subset of the calculated scores (e.g., scores for plans sponsored by organizations in a particular industry).

Benefit plan service 102 may perform steps 1002 to step 1008 periodically (e.g., quarterly) to ensure that benchmarks are dynamically updated to reflect current plan data. Subsequent to calculating plan scores and benchmarks, each may be provided to sponsors, e.g., through sponsor portal 116. For example, at step 1008 and in response to plan sponsor user 118 accessing sponsor portal 116, benefit plan service 102 transmits a plan score indicator corresponding to the benefit plan associated with plan sponsor user 118. When the plan score indicator is received by plan sponsor computing device 120, the plan score indicator causes plan sponsor computing device 120 to display the plan score, e.g., in a corresponding section of sponsor portal 116. Similarly, at step 1010 and also in response to plan sponsor user 118 accessing sponsor portal 116, benefit plan service 102 transmits a benefit score indicator corresponding to the plan score benchmark determined in step 1006. When plan sponsor computing device 120 receives the benchmark score indicator, the benchmark score indicator causes plan sponsor computing device 120 to further display the benchmark score.

H. Other Example Implementations

The primary examples provided in this disclosure relate to scoring and evaluation of benefit plans with a particular emphasis on retirement benefit plans. As noted throughout this disclosure, retirement benefit programs and similar employer-sponsored programs can be particularly challenging to evaluate for several reasons including, but not limited to, the need for dynamic and adaptable scoring systems, accurate modelling and prediction for proposed program changes, reliable and dynamic benchmarking (e.g., periodic benchmarking against other retirement plans offered by other employers within a given market sector or industry), and the ability to evaluate participant engagement. While the solutions to these challenges included in this disclosure are particularly relevant in the context of employer-sponsored retirement benefit plans and other employer-sponsored programs (e.g., employer-sponsored health insurance benefits, health and wellness programs), they can be readily adapted to other applications that are considered within the scope of this disclosure.

In one example, the various solutions provided in this disclosure may be adapted for purposes of evaluating the health of or otherwise scoring an individual's personal finances and personal wealth management using a corresponding platform. For example, a user may provide the platform with information or access to information related to the user's personal finances and may receive a holistic score or evaluation of the user's financial health. The platform may further include functionality that allows a user to model certain changes to their finances and to predict the outcome of those changes on the user's financial score. Finally, the platform may also adapt the benchmarking functionality described herein to provide a user with an indication of how the user's finances compare to others within the user's demographic or against thresholds related to financial health and security.

The general categories of plan design, access to informational resources, and engagement discussed above in the context of retirement benefit plans can be readily adapted to a personal finance context for purposes of providing the scoring, modelling, and benchmarking features noted above. For example, while plan design in the context of a retirement benefit plan general relates to the type and scope of plan features, in the personal finance context, design of an individual's personal finances may be based on the scope and variety of the individual's finances (e.g., transactional accounts, investment portfolios, real estate ownership, amount and type of debt, etc.). Access to and use of relevant educational materials in the context of retirement benefit services may similarly be translated to financial literacy and education. For example, a user's overall personal financial score/health may be determined in part by a user's access of educational materials (e.g., articles, interactive modules, multimedia content, etc.) available through the personal finance platform, scores on personal-finance related quizzes, and the like.

As previously discussed in the context of FIGS. 3A-5C, implementations of this disclosure may include functionality directed to providing recommendations for improving a benefit plan, tracking benefit plan performance over time, and modelling benefit plan outcomes. Such features may be readily adapted to the personal finance context as well. In addition to providing a current score for a user based on the user's current financial information, implementations of this disclosure may provide one or more recommendations for the user to improve his or her score. For example, platforms according to this disclosure may provide recommendations to a user related to balancing an investment portfolio, paying down or paying off certain debts, improving the user's credit score, establishing an emergency fund, consuming educational content, or pursuing similar aspects of personal financial health and wellness. Platforms may also support functionality directed to transferring funds, initiating investment-related trades, making payments, and other actions in accordance with the recommendations provided. The user may also have access to historical scores and related statistical data such that the user can see trends in the user's score and how adoption of certain recommendations or implementation of other changes by the user have affected the user's score over time. Similarly, platforms according to this disclosure may provide users with predictive modelling functionality that allow users to see the potential impact of implementing recommendations or other changes on the user's financial wellness.

In at least some implementations of this disclosure, personal financial analysis and scoring may be provided in the context of a broader organizational benefit plan. For example, an organization may provide its employees with personal financial analysis and scoring in the context of a broader retirement plan provided by the organization. In such cases, analysis and scoring of a user's financial health and wellness may consider any related benefits provided by the organization and related data collected from the organization. For example, a user's financial score may consider whether an organization offers a matching program for retirement or other plan contributions and, if so, whether and to what extent the user is taking advantage of such programs. Among other things, analysis and scoring of the user's financial health may include recommendations directly related to an organization's benefits (e.g., increasing contributions to take full advantage of a matching program offered by the organization) and benchmarking against similar employees (e.g., those with similar roles, in similar locations, or with similar timelines to retirement).

Various features of the systems and methods of this disclosure may also be implemented for more general scoring and evaluation of programs, products, services, and entities. For example, investors are frequently interested in the social responsibility of companies and seek to invest in companies with stances and policies related to environmental, social, and governance ("ESG") factors consistent with their values and interests. Similar to the personal finance example discussed above, concepts of this disclosure related to dynamic, multi-factor scoring, benchmarking, and predictive modelling can be readily adapted to the ESG context, such as to provide ongoing and automated evaluation of companies with respect to ESG policies and practices. For example, aspects of this disclosure may be incorporated into a platform for analyzing and evaluating potential investments from and ESG perspective or a platform that allows companies to evaluate and improve their ESG practices and policies.

With respect to environmental factors, scoring in such platforms may be based on the adoption of policies related to climate change and sustainability, the environmental impact of products and services provided by the company, and the carbon footprint of the company's operations. Similarly, social factors may include metrics and policies related to diversity, labor relations, and human rights while governance may be related to management structures, board independence, executive compensation, etc. Metrics and other information related to these factors may be provided to or accessed by the system and used to generate a holistic evaluation (e.g., a score) that quantifies or otherwise characterizes the company's ESG policies and practices. As in the case of employee-sponsored retirement benefit plans, the scoring system used to perform the ESG analysis may include scoring ranges, weightings, and factors that are dynamically updated by the system as data is collected by the system. The system may also benchmark a company's ESG score/evaluation against other companies within a given market sector or industry and, as in the case of benefit plans discussed above, may dynamically and automatically perform updates to the benchmark data. The predictive modelling aspects of this disclosure may also be adapted to allow a company to predict the impact on its ESG score of adopting or modifying company policies and practices.

I. Example Computing System

Figure 11:
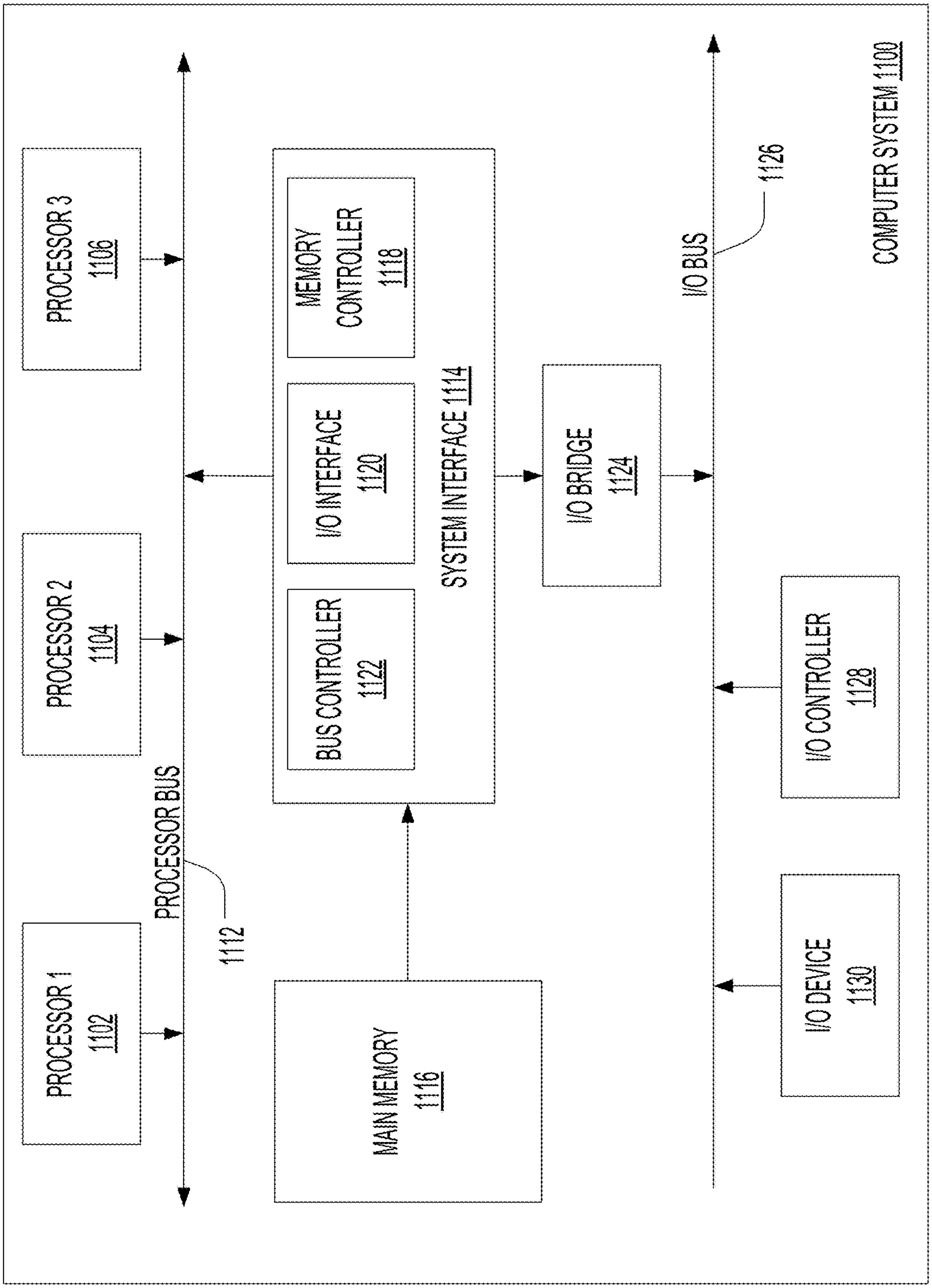
FIG. 11 is a block diagram illustrating an example of a computing device or computer system which may be used in implementations of the present disclosure.

FIG. 11 is a block diagram illustrating an example of a computing device or computer system 1100 which may be used in implementations of the present disclosure. In particular, the computing device of FIG. 11 is one embodiment of any of the devices that perform one of more of the operations described above. For example, such devices may include any of the devices of the environment 100 illustrated in FIG. 1.

The computer system 1100 includes one or more processors 1102-1106. Processors 1102-1106 may include one or more internal levels of cache (not shown) and a bus controller or bus interface unit to direct interaction with the processor bus 1112. Processor bus 1112, also known as the host bus or the front side bus, may be used to couple the processors 1102-1106 with the system interface 1114. System interface 1114 may be connected to the processor bus 1112 to interface other components of the system 1100 with the processor bus 1112. For example, system interface 1114 may include a memory controller 1118 for interfacing a main memory 1116 with the processor bus 1112. The main memory 1116 typically includes one or more memory cards and a control circuit (not shown). System interface 1114 may also include an input/output (I/O) interface 1120 to interface one or more I/O bridges or I/O devices with the processor bus 1112. One or more I/O controllers and/or I/O devices may be connected with the I/O bus 1126, such as I/O controller 1128 and I/O device 1130, as illustrated.

I/O device 1130 may also include an input device (not shown), such as an alphanumeric input device, including alphanumeric and other keys for communicating information and/or command selections to the processors 1102-1106. Another type of user input device includes cursor control, such as a mouse, a trackball, or cursor direction keys for communicating direction information and command selections to the processors 1102-1106 and for controlling cursor movement on the display device.

System 1100 may include a dynamic storage device, referred to as main memory 1116, or a random access memory (RAM) or other computer-readable devices coupled to the processor bus 1112 for storing information and instructions to be executed by the processors 1102-1106. Main memory 1116 also may be used for storing temporary variables or other intermediate information during execution of instructions by the processors 1102-1106. System 1100 may include a read only memory (ROM) and/or other static storage device coupled to the processor bus 1112 for storing static information and instructions for the processors 1102-1106. The system set forth in FIG. 11 is but one possible example of a computer system that may employ or be configured in accordance with aspects of the present disclosure.

According to one implementation, the above techniques may be performed by computer system 1100 in response to processor 1104 executing one or more sequences of one or more instructions contained in main memory 1116. These instructions may be read into main memory 1116 from another machine-readable medium, such as a storage device. Execution of the sequences of instructions contained in main memory 1116 may cause processors 1102-1106 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 1116. Common forms of a machine-readable media may include, but is not limited to, magnetic storage media; optical storage media (e.g., CD-ROM); magneto-optical storage media; read only memory (ROM); random access memory (RAM); erasable programmable memory (e.g., EPROM and EEPROM); flash memory; or other types of media suitable for storing electronic instructions.

Embodiments of the present disclosure include various operations, which are described in this specification. The steps may be performed by hardware components or may be embodied in machine-executable instructions, which may be used to cause a general-purpose or special-purpose processor programmed with the instructions to perform the operations. Alternatively, the operations may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer-implemented method comprising:

periodically accessing one or more plan parameter values for a plurality of benefit plans;

responsive to accessing the one or more plan parameter values for the plurality of benefit plans, calculating, by a plan scoring model comprising at least one parameter and at least one weighted value associated with the at least one parameter, a respective plan score for each of the plurality of benefit plans, wherein calculating a plan score for a benefit plan includes:

for each of a plurality of plan parameters:

accessing a parameter value; and computing a contribution of the parameter value to the plan score based on each of the parameter value, a parameter weight, and a parameter range for a plan parameter; and aggregating each of the contributions to generate the plan score;

responsive to calculating the respective plan scores, determining a plan score benchmark based on the respective plan scores;

responsive to access by a computing device of a plan sponsor portal for a benefit plan of the plurality of benefit plans, each of:

transmitting a plan score indicator corresponding to the plan score for the benefit plan, wherein, when received at the computing device, the plan score indicator causes an interface program executed on the computing device to present the plan score for the benefit plan;

transmitting a benchmark indicator corresponding to the plan score benchmark, wherein, when received at the computing device, the plan score indicator causes the interface program executed on the computing device to present the plan score for the benefit plan;

generating, in response to a selection of a link via the computing device, a plan report comprising at least the plan score indicator and the benchmark indicator;

translating the plan report into a format for integration into a document program different than the interface program; and transmitting the translated plan report to the computing device for integration into the document program executed by the computing device; and adjusting, based on the plan score for the benefit plan and the selection of the link via the computing device, the at least one weighted value of the plan scoring model.

2. The computer-implemented method of claim 1, wherein periodically accessing the plan parameter values includes accessing the plan parameter values quarterly.

3. The computer-implemented method of claim 1, wherein the plan score benchmark is a predetermined percentile of the calculated plan scores.

4. The computer-implemented method of claim 1, wherein the plan score benchmark is based on one of more characteristics of a plan sponsor.

5. The computer-implemented method of claim 1, wherein:

the plan score benchmark is based on one of more characteristics of a plan sponsor, and the one or more characteristics of the plan sponsor include one or more of:

a quantity of personnel of a business entity associated with the plan sponsor, an industry of the plan sponsor, a type of entity of the plan sponsor, one or more other benefits provided by the plan sponsor, and a financial metric of the plan sponsor.

6. The computer-implemented method of claim 1, further comprising in response to a first access of the plan sponsor portal, causing the computing device to prompt a user of the computing device to provide additional information for at least one of the benefit plan, a plan sponsor, other benefits offered by the plan sponsor, and benefit-related goals for the plan sponsor.

7. The computer-implemented method of claim 1, further comprising responsive to access by the computing device, presenting a prioritized list of benefit plan options not already implemented in the benefit plan.

8. The computer-implemented method of claim 1, further comprising responsive to access by the computing device, presenting a prioritized list of benefit plan options not already implemented in the benefit plan, wherein the prioritized list is organized based on impact on a benefit plan metric per unit of estimated cost to implement the option.

9. A system, comprising:

one or more processors; and memory storing thereon instructions that, as a result of being executed by the one or more processors, cause the system to perform operations including:

periodically accessing one or more plan parameter values for a plurality of benefit plans;

responsive to accessing the one or more plan parameter values for the plurality of benefit plans, calculating, by a plan scoring model comprising at least one parameter and at least one weighted value associated with the at least one parameter, a respective plan score for each of the plurality of benefit plans, wherein calculating a plan score for a benefit plan includes:

for each of a plurality of plan parameters:

accessing a parameter value, computing a contribution of the parameter value to the plan score based on each of the parameter value, a parameter weight, and a parameter range for a plan parameter; and aggregating each of the contributions to generate the plan score;

responsive to calculating the respective plan scores, determining a plan score benchmark based on the respective plan scores;

responsive to access by a computing device of a plan sponsor portal for a benefit plan of the plurality of benefit plans, each of:

transmitting a plan score indicator corresponding to the plan score for the benefit plan, wherein, when received at the computing device, the plan score indicator causes an interface program executed on the computing device to present the plan score for the benefit plan;

transmitting a benchmark indicator corresponding to the plan score benchmark, wherein, when received at the computing device, the plan score indicator causes the interface program executed on the computing device to present the plan score for the benefit plan;

generating, in response to a selection of a link via the computing device, a plan report comprising at least the plan score indicator and the benchmark indicator;

translating the plan report into a format for integration into a document program different than the interface program; and transmitting the translated plan report to the computing device for integration into the document program executed by the computing device; and adjusting, based on the plan score for the benefit plan and the selection of the link via the computing device, the at least one weighted value of the plan scoring model.

10. The system of claim 9, wherein periodically accessing the plan parameter values includes accessing the plan parameter values quarterly.

11. The system of claim 9, wherein the plan score benchmark is a predetermined percentile of the calculated plan scores.

12. The system of claim 9, wherein the plan score benchmark is based on one of more characteristics of a plan sponsor.

13. The system of claim 9, wherein:

the plan score benchmark is based on one of more characteristics of a plan sponsor, and the one or more characteristics of the plan sponsor include one or more of:

a quantity of personnel of a business entity associated with the plan sponsor, an industry of the plan sponsor, a type of entity of the plan sponsor, one or more other benefits provided by the plan sponsor, and a financial metric of the plan sponsor.

14. The system of claim 9, further comprising in response to a first access of the plan sponsor portal, causing the computing device to prompt a user of the computing device to provide additional information for at least one of the benefit plan, a plan sponsor, other benefits offered by the plan sponsor, and benefit-related goals for the plan sponsor.

15. The system of claim 9, further comprising responsive to access by the computing device, presenting a prioritized list of benefit plan options not already implemented in the benefit plan.

16. A non-transitory, computer-readable storage medium storing thereon executable instructions that, as a result of being executed by a computer system, cause the computer system to perform operations including:

periodically accessing one or more plan parameter values for a plurality of benefit plans;

responsive to accessing the one or more plan parameter values for the plurality of benefit plans, calculating, by a plan scoring model comprising at least one parameter and at least one weighted value associated with the at least one parameter a respective plan score for each of the plurality of benefit plans, wherein calculating a plan score for a benefit plan includes:

for each of a plurality of plan parameters:

accessing a parameter value; and computing a contribution of the parameter value to the plan score based on each of the parameter value, a parameter weight, and a parameter range for a plan parameter; and aggregating each of the contributions to generate the plan score;

responsive to calculating the respective plan scores, determining a plan score benchmark based on the respective plan scores;

responsive to access by a computing device of a plan sponsor portal for a benefit plan of the plurality of benefit plans, each of:

transmitting a plan score indicator corresponding to the plan score for the benefit plan, wherein, when received at the computing device, the plan score indicator causes an interface program executed on the computing device to present the plan score for the benefit plan;

transmitting a benchmark indicator corresponding to the plan score benchmark, wherein, when received at the computing device, the plan score indicator causes the interface program executed on the computing device to present the plan score for the benefit plan;

generating, in response to a selection of a link via the computing device, a plan report comprising at least the plan score indicator and the benchmark indicator;

translating the plan report into a format for integration into a document program different than the interface program; and transmitting the translated plan report to the computing device for integration into the document program executed by the computing device; and adjusting, based on the plan score for the benefit plan and the selection of the link via the computing device, the at least one weighted value of the plan scoring model.

17. The non-transitory, computer-readable storage medium of claim 16, wherein periodically accessing the plan parameter values includes accessing the plan parameter values quarterly.

18. The non-transitory, computer-readable storage medium of claim 16, wherein the plan score benchmark is a predetermined percentile of the calculated plan scores.

19. The non-transitory, computer-readable storage medium of claim 16, wherein the plan score benchmark is based on one of more characteristics of a plan sponsor.

20. The non-transitory, computer-readable storage medium of claim 16, further comprising in response to a first access of the plan sponsor portal, causing the computing device to prompt a user of the computing device to provide additional information for at least one of the benefit plan, a plan sponsor, other benefits offered by the plan sponsor, and benefit-related goals for the plan sponsor.

* * * * *